United States Patent [19]

Ikemoto et al.

[11] Patent Number: 4,821,191
[45] Date of Patent: Apr. 11, 1989

[54] SYSTEM FOR VEHICLE HEIGHT ADJUSTMENT WITH LOADING DEVIATION CORRECTION

[75] Inventors: Hiroyuki Ikemoto; Yasuji Arai; Osamu Yasuike; Nobutaka Oowa, all of Toyota; Shunichi Doi, Aichi, all of Japan

[73] Assignees: Toyota Jidosha Kabushiki Kaisha; Toyota Central Research and Development Laboratories, Inc., both of Aichi, Japan

[21] Appl. No.: 921,450

[22] Filed: Oct. 22, 1986

[30] Foreign Application Priority Data

Oct. 22, 1985 [JP] Japan .................. 60-235652

[51] Int. Cl.$^4$ ........................................... G60G 17/10
[52] U.S. Cl. .................................. 364/424.1; 280/707
[58] Field of Search ............... 364/424, 426, 424.1; 280/707, 6.1, 6 R, 6 H; 188/279, 280, 297, 299

[56] References Cited

U.S. PATENT DOCUMENTS

| 4,616,847 | 10/1986 | Kanai et al. | 280/707 |
| 4,625,993 | 12/1986 | Williams et al. | 280/707 |
| 4,625,994 | 12/1986 | Tanaka et al. | 280/707 |
| 4,693,493 | 9/1987 | Ikemoto et al. | 280/707 |
| 4,700,303 | 10/1987 | Tokuyama et al. | 364/424 |

FOREIGN PATENT DOCUMENTS

| 0035330 | 9/1981 | European Pat. Off. |
| 0114757 | 8/1984 | European Pat. Off. |
| 0115202 | 8/1984 | European Pat. Off. |
| 2155207 | 9/1985 | United Kingdom. |
| 2155658 | 9/1985 | United Kingdom. |

Primary Examiner—Parshotam S. Lall
Assistant Examiner—Thomas G. Black
Attorney, Agent, or Firm—Oliff & Berridge

[57] ABSTRACT

In this vehicle height adjustment system, a plurality of actuator assemblies are provided, one corresponding to each one of the vehicle wheels and resiliently suspending it from the vehicle body. These actuator assemblies have pressure chambers, and each is adapted to increase or decrease the vehicle height at a location corresponding to its corresponding wheel as respective results of supplying or discharging of working fluid to or from its pressure chamber. Working fluid supply/discharge means are provided corresponding to the actuator assemblies and supply and discharge working fluid to and from their pressure chambers. Wheel loading detection means are provided for sensing parameters representative of the loadings imposed by the vehicle body on the wheels, and vehicle height detection means are provided for sensing the heights of the vehicle above the wheels. A means for computing and control controls the working fluid supply/discharge means, based on the deviations of the actual wheel heights from standard wheel heights, and carries out control adjustment of the actual wheel heights to the standard wheel heights by, at least when the vehicle speed is below a determinate value, carrying out a correction to the adjustment control of the working fluid supply/discharge means, based upon the deviations of the actual wheel loadings from standard wheel loadings, by an amount appropriate substantially to eliminate the loading deviations.

13 Claims, 8 Drawing Sheets

SYSTEM FOR VEHICLE HEIGHT ADJUSTMENT WITH LOADING DEVIATION CORRECTION

BACKGROUND OF THE INVENTION

The present invention relates to a vehicle height adjustment system for an automotive vehicle, and more specifically relates to a vehicle height adjustment system of the suspension height adjustment type which is particularly adapted for preventing imbalances between the suspension loadings imposed on the various vehicle wheels.

The present invention has been described in Japanese Patent Application Ser. No. 60-235652 (1985), filed by applicants the same as the applicants or those assigned or owed duty of assignment of the present patent application; and the present patent application hereby incorporates into itself by reference the text of said Japaneses Patent Application and the claims and the drawings thereof; a copy is appended to the present application.

Further, the present inventors wish hereby to attract the attention of the examining authorities to copending Patent Applications Ser. Nos. 921,138 filed Oct. 21, 1986, 921,251 filed Oct. 21, 1986, 921,451 filed Oct. 22, 1986 and 921,468, filed Oct. 22, 1986, which may be considered to be material to the examination of the present patent application.

The following problem can arise in the case where a vehicle is fitted with a vehicle height adjustment system comprising: a plurality of actuators which are provided for resiliently suspending the vehicle wheels from its body and which are adapted to increase or decrease vehicle height at locations corresponding to the associated vehicle wheels as respective results of supplying or discharging working fluid to or from variable volume working fluid pressure chambers of said actuators; a plurality of working fluid supplying and discharging means which are provided corresponding to the actuators and which serve to supply or discharge the working fluid to or from said pressure chambers of said actuators (such working fluid supplying and discharging means are typically controlled by duty ratio control); a vehicle height detecting means for sensing vehicle body heights over the various wheels thereof (the terms "wheel height" and "suspension height" will be utilized hereinafter in this specification, although strictly speaking it is the suspended heights of the portion of the vehicle body over each of its wheels as set by the vehicle suspension which are meant); and a control means for controlling the various working fluid supplying and discharging means based upon the data sensed by the vehicle height detecting means in order to control the adjustment of the suspension heights of the vehicle wheels to certain determinate wheel heights, as proposed, for example, in the specifications of Japanese Patent Laying Open Publication Serial No. Sho 60-85005 (1985) and Japanese Patent Laying Open Publication Serial No. Sho 60-235654 (1985), both of which were filed by an applicant the same as one of the applicants or one of the assignees or one of the entitles owed duty of assignment of the present application and which it is not intended hereby to admit as prior art to the present patent application except to the extent in any case required by applicable law. Namely, in such a case, the hydraulic fluid supply and draining means for the actuators are controlled by the control device according to a feedback process, based upon the deviations between the actual wheel heights and certain determinate target wheel heights (or "standard" wheel heights), as a result of which the suspension height of the whole vehicle, taken overall, can indeed be satisfactorily adjusted, but the balance between the loadings imposed upon each vehicle wheel, in other words the proportions in which the supporting of the weight of the vehicle is split up between the various vehicle wheels, can be easily disturbed, and therefore it could in the worst case occur that one of the vehicle wheels comes to be in a floating or semi floating state with relatively little suspension pushing force biasing said vehicle wheel downwards against the road surface, and this can deteriorate a vehicle stability and cause excessive and/or uneven tire wear, among other problems.

Further, in general, in the operational conditions where a vehicle such as an automobile is turning as for example around a curve, the body of the vehicle experiences rolling, i.e. the vehicle body inclines in the radially outward direction and tips towards the wheels on its radially outward edge, and this body rolling can easily result in deterioration of the drivability of the vehicle.

In order to cope with the above problems, it might be considered, during such a turn, to increase the damping effect of those of the shock absorber means which are fitted to said vehicle wheels on the radially outward edge of the vehicle, and/or to increase the spring constant of those of the spring means which are fitted to said vehicle wheels on the radially outward edge of the vehicle. Such a concept is outlined in Japanese Patent Laying Open Publication Serial No. 59-120509 (1984) and in Japanese Patent Application Serial No. Sho 59-172416 (1984), neither of which is it intended hereby to admit as prior art to the present patent application except to the extent in any case required by applicable law; and reference should also be made to Japanese Utility Model Laying Open Publication Serial No. 59-35105 (1984), Japanese Patent Laying Open Publication Serial No. 53-26021 (1978), Japanese Patent Laying Open Publication Serial No. 58-167210 (1983), and Japanese Utility Model Laying Open Publication Serial No. 56-147107 (1981), again none of which is it intended hereby to admit as prior art to the present patent application except to the extent in any case required by applicable law. However, with these concepts, merely the suspension of the vehicle on the outer side edge thereof with respect to the turn is hardened, and thus the rolling of the vehicle body may be somewhat attenuated as compared with the case when such suspension hardening is not performed, but the rolling of the vehicle body cannot necessarily be adequately prevented. Accordingly, such a concept does not really resolve the problem.

SUMMARY OF THE INVENTION

The present invention considers the problems described above which arise with such a vehicle height adjustment system, and has as its primary object to avoid the problems detailed above.

Another object of the present invention is to provide a vehicle height adjustment system which prevents imbalances developing between the loadings imposed upon the various vehicle wheels.

Another object of the present invention is to provide a vehicle height adjustment system which prevents that any of the vehicle wheels should come to be in a floating or a semi floating state.

Another object of the present invention is to provide a vehicle height adjustment system which improves tire durability and militates against uneven and excessive tire wear.

Yet another object of the present invention is the provision of an improved vehicle height adjustment system which controls the working fluid supplying and discharging means for the suspension actuators so as to prevent the vehicle body from rolling.

Yet another object of the present invention is the provision of an improved vehicle height adjustment system which controls the working fluid supplying and discharging means for the suspension actuators so as to prevent the vehicle body from rolling.

Yet another object of the present invention is to provide a vehicle height adjustment system which improves overall drivability.

Yet another object of the present invention is to provide a vehicle height adjustment system which improves vehicle steering stability.

According to a first general aspect of the present invention, the above and other objects are attained by, for a vehicle comprising a body and a plurality of wheels upon which said vehicle runs, a vehicle height adjustment system, comprising: (a) a plurality of actuator assemblies, one provided corresponding to each one of said vehicle wheels and resiliently suspending said one of said vehicle wheels from the vehicle body, sad actuator assemblies comprising pressure chambers and each increasing and decreasing vehicle height at a location corresponding to its corresponding vehicle wheel as respective results of supply of working fluid to and discharge of working fluid from its said pressure chamber; (b) a plurality of working fluid supplying and discharging means, which are provided corresponding to said actuator assemblies, for supplying working fluid to said pressure chambers and for discharging working fluid from said pressure chambers; (c) a plurality of loading detection means, which are provided corresponding to said vehicle wheels, for sensing parameters representative of the loadings imposed by the vehicle body on said vehicle wheels; (d) a plurality of vehicle height detection means, which are provided corresponding to said vehicle wheels, for sensing parameters representative of the heights of the vehicle body over said vehicle wheels; and: (e) a computing and control means for controlling said working fluid supplying and discharging means based on the deviation of the actual wheel heights as detected by sid vehicle height detection means from standard wheel heights, and carrying out control adjustment of said actual wheel heights to sid standard wheel heights, by carrying out a correction to the adjustment control of said working fluid supplying and discharging means, based upon the deviations of the actual wheel loadings as detected by said loading detection means from standard wheel loadings, by an amount appropriate substantially to eliminate said loading deviations.

According to such a construction as specified above, with the control means controlling the working fluid supplying and discharging means based on the deviation of the actual wheel heights detected by the wheel height detection means from standard wheel heights and carrying out a control adjustment of the wheel heights to the standard wheel heights, the operation is such as to carry out a correction to the adjustment control of the working fluid supplying and discharging means based on the deviations of the actual wheel loadings and standard loadings by amounts necessary substantially to eliminate said loading deviations, and therefore not only can the wheel heights be adjusted to standard wheel heights, but the loadings of the vehicle wheels can be satisfactorily balanced, and thereby the stability of the vehicle can be improved, and also the danger of uneven tire wear can be reduced, while avoiding the occurrence of the state in which one wheel only is floating.

According to a more detailed aspect of the present invention, the above and other objects are more particularly attained by a vehicle height adjustment system of the above construction, wherein said loading detection means, for each said working fluid supplying and discharging means, is a pressure detecting means which detects the pressure within said pressure chamber of said working fluid supplying and discharging means as the fluctuation corresponding to the loading of the corresponding vehicle wheel.

According to a section general aspect of the present invention, the above and other objects are more particularly attained by, for a vehicle comprising a body and a plurality of wheels upon which said vehicle runs, a vehicle height adjustment system, comprising: (a) a plurality of actuator assemblies, one provided corresponding to each one of said vehicle wheels and resiliently suspending said one of said vehicle wheels from the vehicle body, said actuator assemblies comprising pressure chambers and each increasing and decreasing vehicle height at a location corresponding to its corresponding vehicle wheel as respective results of supply of working fluid to and discharge of working fluid from its said pressure chamber; (b) a plurality of working fluid supplying and discharging means, which are provided corresponding to said actuator assemblies, for supplying working fluid to said pressure chambers and for discharging working fluid from said pressure chambers; (c) a plurality of loading detection means, which are provided corresponding to said vehicle wheels, for sensing parameters representative of the loadings imposed by the vehicle body on said vehicle wheels; (d) a plurality of vehicle height detection means, which are provided corresponding to said vehicle wheels, for sensing parameters representative of the heights of the vehicle body over said vehicle wheels; and: (e) a computing and control means for controlling said working fluid supplying and discharging means based on the deviations of the actual wheel heights as detected by said vehicle height detection means from standard wheel heights, and carrying out control adjustment of said actual wheel heights to said standard wheel heights, by carrying out a correction to the adjustment control of said working fluid supplying and discharging means: when the road speed of said vehicle is less than a determinate value, based upon the deviations of the actual wheel loadings as detected by said loading detection means from standard wheel loadings, by an amount appropriate substantially to eliminate said loading deviations; and, when the road speed of said vehicle is greater than said determinate value, based upon a loading signal obtained by passing through high band pass filters signals indicting the actual wheel loadings as detected by said loading detection means, by an amount appropriate substantially to eliminate the deviations of the actual wheel loadings as detected by said loading detection means from standard wheel loadings.

According to such a construction as specified above, the control means, when the speed of the vehicle is less than a certain value, carries out a correction to the adjustment control of the working fluid supplying and discharging means based on the deviations of the actual loadings detected by the loading detection means and standard loadings by amounts necessary substantially to eliminate the loading deviations, and, when the vehicle speed is at least the certain value, carries out a correction to the adjustment control of the working fluid supplying and discharging means based on signals indicating the actual loadings input from the loading detection means and passed through high band pass filters, that is to say signals indicating predicted variations of the loadings, by amounts necessary substantially to eliminate the deviations between the predicted values and standard loadings, and therefore not only can the wheel heights be adjusted to standard wheel heights, but also when the vehicle speed is less than the certain value the loadings of the vehicle wheels can be satisfactorily balanced, and thereby the stability of the vehicle can be improved, and also the danger of uneven tire wear can be reduced, while avoiding the occurrence of the state in which one wheel only is floating, while, when the vehicle speed is at least the certain value, changes in attitude of the vehicle such as rolling and pitching due to the motion of the vehicle can be positively prevented, and thereby the steering stability of the vehicle can be improved.

According to a more detailed aspect of the present invention, the above and other objects are more particularly attained by a vehicle adjustment system of the above construction, wherein said computing and control means is for: when the road speed of said vehicle is less than a determinate value, or when the road speed of said vehicle is less than a determinate value and also the vehicle is substantially travelling along a straight line, carrying out a correction to the adjustment control of said working fluid supplying nd discharging means based upon the deviations of the actual wheel loadings as detected by said loading detection means from standard wheel loadings, by an amount appropriate substantially to eliminate said loading deviations; and, when the road speed of said vehicle is greater than said determinate value and also the vehicle is substantially travelling along a curve, carrying out a correction to the adjustment control of sid working fluid supplying and discharging means based upon a loading signal obtained by passing through high band pass filters signals indicating the actual wheel loadings as detected by said loading detection means, by an amount appropriate substantially to eliminate the deviations of the actual wheel loadings as detected by said loading detection means from standard wheel loadings.

According to another more detailed aspect of the present invention, the above and other objects are more particularly attained by a vehicle height adjustment system of the above construction, said vehicle having tires, wherein said computing and control means is for: when the road speed of said vehicle is greater than said determinate value, deriving a value representing the flexion amounts of said tires based on signals indicating the deviations of the actual wheel loadings as detected by said loading detection means from standard wheel loadings, fixing as new standard wheel heights the sums of the previous standard wheel heights and said values representing the flexion amounts of said tires, and carrying out a correction to the adjustment control of said working fluid supplying and discharging means based upon a loading signal obtained by passing through high band pass filters signals indicating the actual wheel loadings as detected by said loading detection means, and based upon a signal indicating an amount appropriate to compensate for said tire flexion.

According to another more detailed aspect of the present invention, the above and other objects are more particularly attained by a vehicle height adjustment system of the above construction, said vehicle having tires, wherein said computing and control means is for: when the road speed of said vehicle is less than said determinate value, or when the road speed of sid vehicle is less than a determinate value and also the vehicle is substantially travelling along a straight line, carrying out a correction to the adjustment control of said working fluid supplying and discharging means based upon the deviations of the actual wheel loadings as detected by said loading detection means from standard wheel loadings, by an amount appropriate substantially to eliminate said loading deviations; and, when the road speed of said vehicle is greater than said determinate value and also the vehicle is substantially travelling along a curve, deriving a value representing the flexion amounts of said tires based on signals indicating the deviations of the actual wheel loadings as detected by said loading detection means from standard wheel loadings, fixing as new standard wheel heights the sums of the previous standard wheel heights and said values representing the flexion amounts of said tires, and carrying out a correction to the adjustment control of said working fluid supplying and discharging means based upon a loading signal obtained by passing through high band pass filters signals indicating the actual wheel loadings as detected by said loading detection means, and based upon a signal indicating an amount appropriate to compensate for said tire flexion.

According to another more detailed aspect of the present invention, the above and other objects are more particularly attained by a vehicle height adjustment system of the above construction, wherein said loading detection means, for each said working fluid supplying and discharging means, is a pressure detecting means which detects the pressure within said pressure chamber of said working fluid supplying and discharging means as the fluctuation corresponding to the loadings of the corresponding vehicle wheel.

And, according to a third general aspect of the present invention, the above and other objects are attained by, for a vehicle comprising a body and a plurality of wheels upon which said vehicle runs, a vehicle heights adjustment system, comprising: (a) a plurality of actuator assemblies, one provided corresponding to each one of said vehicle wheels and resiliently suspending said one of said vehicle wheels from the vehicle body, said actuator assemblies comprising pressure chambers and each increasing and decreasing vehicle height at a location corresponding to its corresponding vehicle wheel as respective results of supply of working fluid to and discharge of working fluid from its said pressure chamber; (b) a plurality of working fluid supplying and discharging means, which are provided corresponding to said actuator assemblies, for supplying working fluid to said pressure chambers and for discharging working fluid from said pressure chambers; (c) a means for detecting the differential pressure between the pressure chambers of at lesat one left and right pair of said actuator assemblies; (d) a plurality of vehicle height detection means, which are provided corresponding to said vehicle wheels, for sensing parameters representative of the heights of the vehicle body over said vehicle wheels; and: (e) a computing and control means for controlling said working fluid supplying and discharging means based on the deviations of the actual wheel heights as detected by said vehicle height detection means from standard wheel heights, and carrying out control adjustment of said actual wheel heights to said standard wheel heights, and: when the road speed of said vehicle is less than a determinate value, carrying out a correction to the adjustment control of said working fluid supplying and discharging means based upon the differential pressure as detected by said differential pressure detection means, by an amount appropriate substantially to eliminate said differential pressure; and, when the road speed of said vehicle is greater than said determinate value, carrying out a correction to the adjustment control of said working fluid supplying and discharging means based upon a differential pressure signal obtained by passing through a high band pass filter a signal indicating the actual differential pressure as detected by said differential pressure detection means, by an amount appropriate substantially to eliminate said differential pressure.

According to such a construction as specified above, the control means, when the speed of the vehicle is less than a certain value, carries out a correction to the adjustment control of the working fluid supplying and discharging means based on a differential pressure detected by a differential pressure detection means by an amount necessary substantially to eliminate the differential pressure, and when the vehicle speed is at least the certain value carries out a correction to the adjustment control of the working fluid supplying and discharging means based on a signal indicating a differential pressure input from the differential pressure detection means and passed through a high band pass filter, that is to say a signal indicating a predicted variation of the fluctuation of the differential pressure, by an amount necessary substantially to eliminate the predicted value of the differential pressure, and therefore not only can the wheel heights be adjusted to standard wheel heights, but also when the vehicle speed is less than the certain value the occurrence of a differential pressure between the working fluid chambers of said pair of actuators, that is to say the state in which one wheel only is floating, will be avoided, and thereby the stability of the vehicle can be improved, and also the danger of uneven tire wear can be reduced, while when the vehicle speed is at least the certain value, vehicle rolling while the vehicle is travelling round a curve can be positively prevented.

According to a more detailed aspect of the present invention, the above and other objects are more particularly attained by a vehicle height adjustment system of the above construction, wherein said computing and control means is for: when the road speed of said vehicle is less than a determinate value and also the vehicle is substantially travelling along a straight line, carrying out a correction to the adjustment control of said working fluid supplying and discharging means based upon the differential pressure as detected by said differential pressure detection means, by an amount appropriate substantially to eliminate said differential pressure; and, when the road speed of said vehicle is greater than said determinate value and also the vehicle is substantially travelling along a curve, carrying out a correction to the adjustment control of said working fluid supplying and discharging means based upon a differential pressure signal obtained by passing through a high band pass filter a signal indicating the actual differential pressure as detected by said differential pressure detection means, by an amount appropriate substantially to eliminate said differential pressure.

According to another more detailed aspect of the present invention, the above and other objects are more particularly attained by a vehicle height adjustment system of the above construction, said vehicle having tires, wherein said computing and control means is for: when the road speed of said vehicle is greater than said determinate value, deriving a value representing the flexion amounts of said tires based on a signal indicating the differential pressure as detected by said differential pressure detection means, fixing as new standard wheel heights the sums of the previous standard wheel heights and said values representing the flexion amounts of said tires, and carrying out a correction to the adjustment control of said working fluid supplying and discharging means based upon a differential pressure signal obtained by passing through a high band pass filter a signal indicating the actual differential pressure as detected by said differential pressure detection means, and based upon a signal indicating an amount appropriate to compensate for said tire flexion.

According to another more detailed aspect of the present invention, the above and other objects are more particularly attained by a vehicle height adjustment system of the above construction, said vehicle having tires, wherein said computing and control means is for: when the road speed of said vehicle is less than said determinate value, or when the road speed of said vehicle is less than a determinate value and also the vehicle is substantially travelling along a straight line, carrying out a correction to the adjustment control of said working fluid supplying and discharging means based upon the differential pressure as detected by said differential pressure detection means, by an amount appropriate substantially to eliminate said differential pressure; and, when the road speed of said vehicle is greater than said determinate value and also the vehicle is substantially travelling along a curve, deriving values representing the flexion amounts of said tires based on a signal indicating the differential pressure as detected by said differential pressure detection means, fixing as new standard wheel heights the sums of the previous standard wheel heights and said values representing the flexion amounts of said tires, and carrying out a correction to the adjustment control of said working fluid supplying and discharging means based upon a differential pressure signal obtained by passing through a high band pass filter a signals indicating the actual differential pressure as detected by said differential pressure detection means, and based upon a signal indicating an amount appropriate to compensate for said tire flexion.

Finally, according to a last more detailed aspect of the present invention, the above and other objects are more particularly attained by a vehicle height adjustment system of any of the last four above constructions, further comprising a conduit communicating together said pressure chambers of said left and right pair of said actuator assemblies, wherein said differential pressure detection means is provided at an intermediate point of said conduit.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

Figure 1:
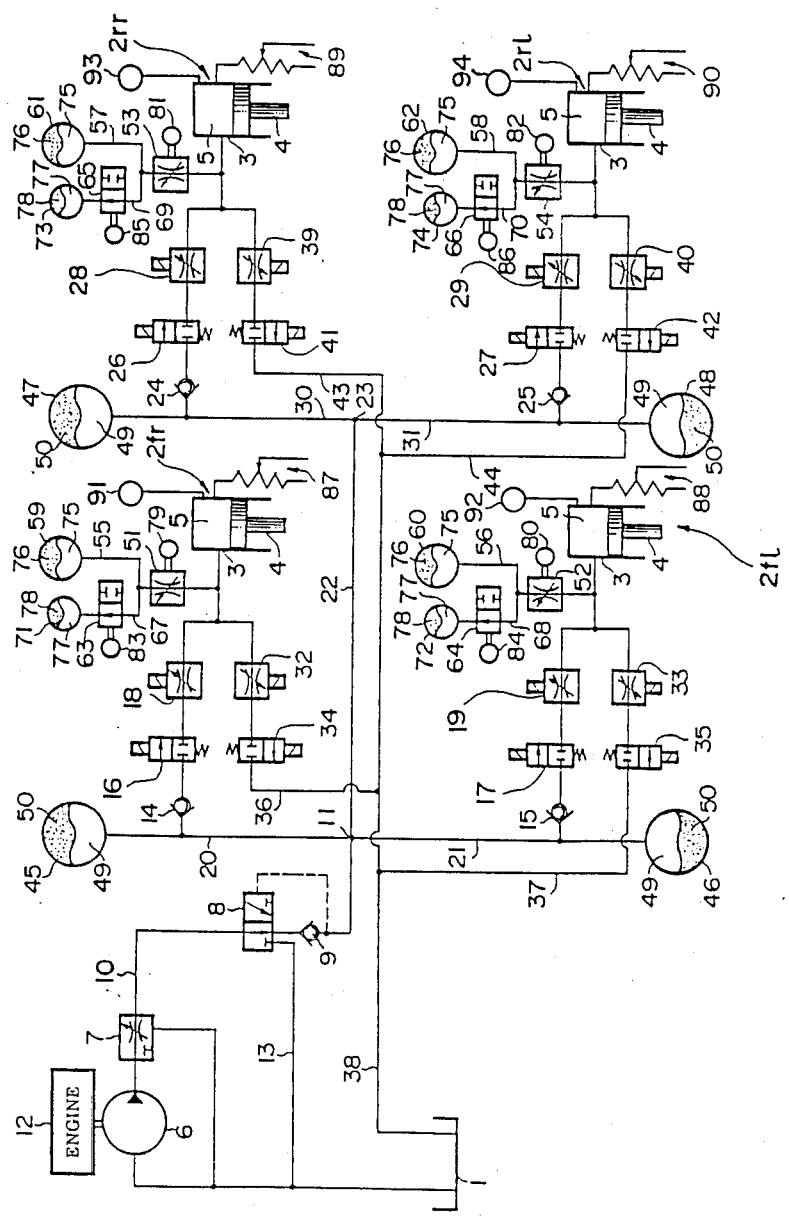
FIG. 1 is a schematic structural diagram showing major physical components of the first preferred embodiment of the system for vehicle height adjustment for an automotive vehicle of the present invention which will be described.
Figure 2:
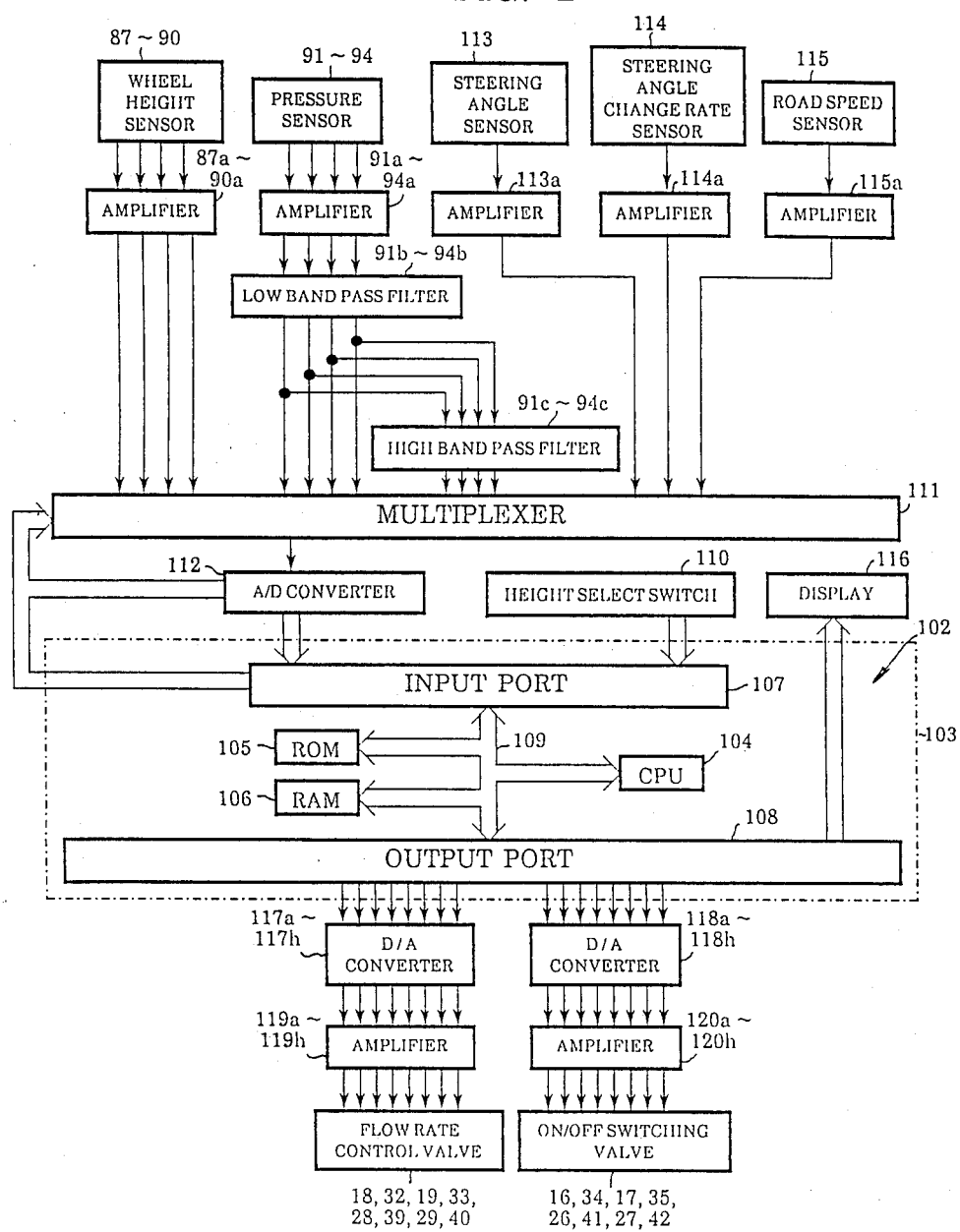
FIG. 2 is an idealized block diagrammatical view showing the internal construction of an electrical control device of a type incorporated in said first preferred embodiment of the present invention, said electrical control device incorporating a micro computer.

The present invention will now be described with reference to the preferred embodiments thereof, and with reference to the figures. The overall constructions of the suspension systems which are concerned with any one of the preferred embodiments of the system for vehicle height adjustment for an automotive vehicle of the present invention which will be described are mutually similar (but not identical), and the constructions of the electrical control devices therefor and of certain micro computers incorporated in said electrical control devices are likewise very similar (but not identical) in all the preferred embodiments, while the control programs which control the operation of said micro computers incorporated in said various preferred embodiments, on the other hand, are substantially different. FIG. 1, therefore, is a schematic diagram showing major physical components of the first preferred embodiment of the system for automotive vehicle roll control of the present invention, and FIG. 2 is a block diagrammatical view showing the internal construction of an electrical control device incorporating a micro computer, incorporated in said first preferred embodiment.

OVERALL SUSPENSION SYSTEM CONSTRUCTION

Figure 3:
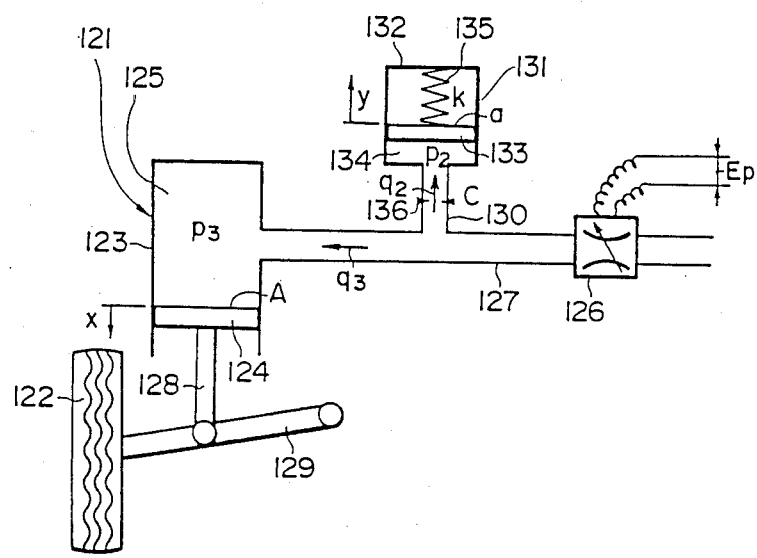
FIG. 3 is a schematic diagram showing one of the vehicle wheels and the suspension system therefor including its actuator, for explaining why a high band pass filter is utilized in the present invention.

Referring first to FIG. 1 which shows the gross mechanical components incorporated in the first preferred embodiment of the vehicle height adjustment system of the present invention that are utilized for vehicle height and ride adjustment, in this figure the reference numeral 1 denotes a suspension working fluid reservoir or sump, while 2*fl*, 2*fr*, 2*rl*, and 2*rr* are actuator assemblies which are provided to, respectively the front left vehicle wheel, the front right vehicle wheel, the rear left vehicle wheel, and the rear right vehicle wheel; one of these vehicle wheels is schematically shown in FIG. 3. And, in and for each of said actuator assemblies 2*fl*, 2*fr*, 2*rl*, and 2*rr*, the reference numeral 3 denotes a cylinder and the reference numeral 4 denotes a piston sliding in said cylinder and cooperating with a closed end thereof to define an actuating pressure chamber 5. Each of said vehicle wheels is rotationally mounted about a substantially horizontal axis to a member such as a suspension arm (shown schematically in FIG. 3 and denoted therein by the reference numeral 129) or the like which is suspended from the body (not shown) of the vehicle by means of a flexible linkage of some per se known sort, and each of said actuator assemblies 2*fl*, 2*fr*, 2*rl*, and 2*rr* is arranged to have one of its cylinder 3 and its piston 4 (its piston 4, in the exemplary schematic illustration of FIG. 3) drivingly coupled to one of said vehicle body and said suspension arm (exemplarily to the suspension arm 129, via the piston rod 128), while the other of its said cylinder 3 and said piston 4 is drivingly coupled to the other of said vehicle body and said suspension arm. Thus, by pressurization by suspension working fluid (abbreviated hereinafter merely as "fluid") of the pressure chamber 5 defined by said cylinder 3 and said piston 4, each of said actuator assemblies 2*fl*, 2*fr*, 2*rl*, and 2*rr* serves for maintaining and adjusting the sprung height from the road surface of the portion of the vehicle body above its associated vehicle wheel, and for determining the characteristics of the springing of said vehicle body with respect to said associated vehicle wheel. In orther possible embodiments of the vehicle height adjustment system of the present invention, other constructions (such as hydraulic ram type devices) would be possible for these actuator assemblies 2*fl*, 2*fr*, 2*rl*, and 2*rr*, as long as each said actuator assembly was capable of increasing and decreasing the sprung height of the portion of the vehicle body above its associated vehicle wheel, corresponding to the supply and the discharge of fluid to a working fluid chamber of said actuator assembly or corresponding to some other control function exerted from a controller, and as long as the pressure in the working fluid chamber increased and decreased in response respectively to bound and rebound of said associated vehicle wheel (or the functional like).

Working fluid for the operation of this suspension system, such as a specialized type of oil or the like, is sucked up from the reservoir 1 by a fluid pump 6 rotationally driven by the engine 12 of the vehicle to which this suspension system is fitted, and a pressurized supply thereof is fed via a conduit 10 through, in order, a flow rate control valve 7, a load mitigating valve 8, and a one way check valve 9 to a conduit junction point 11, and from this junction point 11 via another conduit 22 said pressurized fluid is fed to another conduit junction point 23. This flow rate control valve 7 is constructed so as to control the flow rate of fluid in the conduit 10 according to a signal which it receives. The load mitigating valve 8 is constructed so as to be responsive to the pressure in the conduit 10 downstream of the one way check valve 9 and so as to vent a certain amount of the pressurized fluid in said conduit 10 via a conduit 13 back to a point in the conduit 10 upstream of the pump 6, so as to maintain said pressure in the conduit 10 downstream of the one way check valve 9 at no more than a determinate pressure value. And the check valve 9 prevents the fluid from flowing backwards through the conduit 10 from the conduit junction points 11 and 23 towards the load mitigating valve 8.

The conduit junction point 11 is connected to the cylinder chamber 5 of the actuator 2fr for the front right vehicle wheel via a conduit 20 at intermediate points along which there are provided, in order, a one way check valve 14, an electrically controlled ON/OFF switching valve 16, and an electrically controlled flow rate control valve 18. Similarly, said conduit junction point 11 is connected to the cylinder chamber 5 of the actuator 2fl for the front left vehicle wheel via a conduit 21 at intermediate points along which there are provided, in order, a one way check valve 15, an electrically controlled ON/OFF switching valve 17, and an electrically controlled flow rate control valve 19. The other conduit junction point 23 is connected to the cylinder chamber 5 of the actuator 2rr for the rear right vehicle wheel via a conduit 30 at intermediate points along which there are provided, in order, a one way check valve 24, an electrically controlled ON/OFF switching valve 26, and an electrically controlled flow rate control valve 28. Similarly, said other conduit junction point 23 is connected to the cylinder chamber 5 of the actuator 2rl for the rear left vehcile wheel via a conduit 31 at intermediate points along which there are provided, in order, a one way check valve 25, an electrically controlled ON/OFF switching valve 27, and an electrically controlled flow rate control valve 29. Thus, the cylinder chambers 5 for the actuators 2fr, 2fl, 2rr, and 2rl are selectively supplied with working fluid from the reservoir 1, as pressurized by the pump 6, via the conduits 10, 20 and 21, 22, and 30 and 31, with, as will be described in detail hereinbelow, such supply of pressurized fluid and the flow rate thereof being appropriately and properly controlled by the supply of actuating electrical energy to the electrically controlled ON/OFF switching valves 16, 17, 26, and 27 and to the electrically controlled flow rate control valves 18, 19, 28, and 29.

To a point of the conduit 20 between the electrically controlled flow rate control valve 18 and the cylinder chamber 5 of the actuator 2fr for the front right vehicle wheel there is communicated one end of a conduit 36, the other end of which is connected to a drain conduit 38. At intermediate points on said conduit 36 there are provided an electrically controlled flow rate control valve 32 and an electrically controlled ON/OFF switching valve 34. Similarly, to a point of the conduit 21 between the electrically controlled flow rate control valve 19 and the cylinder chamber 5 of the actuator 2fl for the front left vehicle wheel there is communicated one end of a conduit 37, the other end of which is connected to said drain conduit 38, and at intermediate points on said conduit 37 there are provided an electrically controlled flow rate control valve 33 and an electrically controlled ON/OFF switching valve 35. And to a point of the conduit 30 between the electrically controlled flow rate control valve 28 and the cylinder chamber 5 of the actuator 2rr for the rear right vehicle wheel there is communicated one end of a conduit 43, the other end of which is connected to the drain conduit 38, and at intermediate points on said conduit 43 there are provided an electrically controled flow rate control valve 39 and an electrically controlled ON/OFF switching valve 41, while also to a point of the conduit 31 between the electrically controlled flow rate control valve 29 and the cylinder chamber 5 of the actuator 2rl for the rear left vehicle wheel there is communiated one end of a conduit 44, the other end of which is connected to said drain conduit 38, and at intermediate points on said conduit 44 there are provided an electrically controlled flow rate control valve 40 and an electrically controlled ON/OFF switching valve 42. Thus, the cylinder chambers 5 for the actuators 2fr, 2fl, 2rr, and 2rl are selectively exhausted of pressurized fluid to the reservoir 1 via the conduits 36, 37, 43, 44, and 38, with, as will be described in detail hereinbelow, such exhausting of pressurized fluid and the flow rate thereof being appropriately and properly controlled by the supply of actuating electrical energy to the electrically controlled ON/OFF switching valves 34, 35, 41, and 42 and to the electrically controlled flow rate control valves 32, 33, 39, and 40.

In this shown construction, although such constructional details should be understood as not limitative of the present invention, the electrically controlled ON/OFF switching valves 16, 17, 26, 27, 34, 35, 41, and 42 are constructed as normally closed switching valves incorporating such devices as solenoids (not particularly shown), and, when no actuating electrical energy is supplied to the coil (not shown either) of any one of said solenoids, the respective one of said switching valves 16, 17, 26, 27, 34, 35, 41, and 42 is closed as schematically shown in the figure so as to intercept and so as to prevent flow of fluid in the conduit to which said switching valve is fitted, while on the other hand, when actuating electrical energy is supplied to said coil of said one of said solenoids, said respective one of said switching valves 16, 17, 26, 27, 34, 35, 41, and 42 is opened as also schematically shown in the figure so as to allow flow of fluid in said conduit to which said switching valve is fitted. Also, the electrically controlled flow rate control valves 18, 19, 28, 20, 32, 33, 39, and 40 are constructed so as to vary the degree of restriction which they apply according to the duty ratio of the current of the voltage of actuating electrical pulse signals which they receive, so as to thereby control the flow rate of fluid flowing through the conduits 20, 21, 30, 31, 36, 37, 43, and 44 respectively associated with said flow rate control valves and draining them.

To a point on the conduit 20 intermediate between the junction point 11 and the one way check valve 14, i.e. upstream of said one way check valve 14, there is connected an accumulator 45 which has a fluid chamber 49 and an air chamber 50 which are separated from one another by a diaphragm. This accumulator 45 serves to absorb fluctuations in pressure set up in the conduit 10 due to pulsations in the fluid supply provided by the pump 6 and due to the action of the load mitigating valve 8, and to accumulate pressure for the fluid in the conduit 20. Similarly, to a point on the conduit 21 intermediate between the junction point 11 and the one way check valve 15, i.e. upstream of said one way check valve 15, there is connected an accumulator 46 which has a fluid chamber 49 and an air chamber 50 which are separated from one another by a diaphragm. This accumulator 56 similarly serves to absorb fluctuations in pressure set up in the conduit 10 due to pulsations in the fluid supply provided by the pump 6 and due to the action of the load mitigating valve 8, and to accumulate pressure for the fluid in the conduit 21. And, likewise, to a point on the conduit 23 intermediate between the junction point 11 and the one way check valve 24, i.e. upstream of said one way check valve 24, there is connected an accumulator 47 which has a fluid chamber 49 and an air chamber 50 which are separated from one another by a diaphragm, and this accumulator 47 serves to absorb fluctuations in pressure set up in the conduit 22 due to pulsations in the fluid supply provided by the pump 6 and due to the action of the load mitigating valve 8, and to accumulate pressure for the fluid in the conduit 30; while, similarly, to a point on the conduit 31 intermediate between the junction point 11 and the one way check valve 25, i.e. upstream of said one way check valve 25, there is connected an accumulator 48 which has a fluid chamber 49 and an air chamber 50 which are separated from one another by a diaphragm; and this accumulator 48 similarly serves to absorb fluctuations in pressure set up in the conduit 22 due to pulsations in the fluid supply provided by the pump 6 and due to the action of the load mitigating valve 8, and to accumulate pressure for the fluid in the conduit 31.

To another point on the conduit 20 intermediate between the electrically controlled flow rate control valve 18 and the actuator 2fr for the front right vehicle wheel there is connected one end of a conduit 55, to the other end of which there is connected a main spring 59 which has a fluid chamber 75 and an air chamber 76 which are separated from one aother by a diaphragm. At an intermediate point of said circuit 55 there is fitted a flow rate control valve 51 which is controlled by an electrically operated motor 79. And to a point on said conduit 55 between said flow rate control valve 51 and said main spring 59 there is connected one end of a conduit 67, to the other end of which there is connected a subspring 71 which has a fluid chamber 77 and an air chamber 78 which are separated from one another by a diaphragm. At an intermediate point of said conduit 67 there is fitted a normally open type ON/OFF switching valve 63 which is controlled by an electrically operated motor 83. Thus, as the volume of the cylinder chamber 5 of this actuator 2fr for the front right vehicle wheel varies in response to the bound and the rebound of said front right vehicle wheel and air compressed therein is squeezed and unsqueezed, the fluid in said cylinder chamber 5 and in the fluid chambers 75 and 77 of this main spring 59 and this subspring 71 flows to and fro therebetween through the flow rate control valve 51, and the flow resistance caused thereby poduces a vibratory damping effect. Similarly, to a point on the conduit 21 intermediate between the electrically controlled flow rate control valve 19 and the actuator 2fl for the front left vehicle wheel there is connected one end of a conduit 56, to the other end of which there is connected a main spring 60 which has a fluid chamber 75 and an air chamber 76 which are separated from one another by a diaphragm, and at an intermediate point of said conduit 56 there is fitted a flow rate control valve 52 which is controlled by an electrically operated motor 80. And to a point on said conduit 56 between said flow rate control valve 52 and said main spring 60 there is connected one end of a conduit 68, to the other end of which there is connected a subspring 72 which has a fluid chamber 77 and an air chamber 78 which are separated from one another by a diaphragm. At an intermediate point of said conduit 68 there is fitted a normally open type ON/OFF switching valve 64 which is controlled by an electrically operated motor 84. Thus, as the volume of the cylinder chamber 5 of this actuator 2fl for the front left vehicle varies in response to the bound and the rebound of said front left vehicle wheel and air compressed therein is squeezed and unsqueezed, the fluid in said cylinder chamber 5 and in the fluid chambers 75 and 77 of this main spring 60 and this subspring 72 similarly flows to and fro therebetween through the flow rate control valve 52, and the flow resistance caused thereby similarly produces a vibratory damping effect. And, with relation to the rear suspension for the vehicle, to a point on the conduit 30 intermediate between the electrically controlled flow rate control valve 28 and the actuator 3fr for the rear right vehicle wheel there is similarly connected one end of a conduit 57, to the other end of which there is connected a main spring 61 which likewise has a fluid chamber 75 and an air chamber 76 which are separated from one another by a diaphragm. At an intermediate point of said conduit 57 there is fitted a flow rate control valve 53 which is controlled by an electrically operated motor 81, and to a point on said conduit 57 between said flow rate control valve 53 and said main spring 61 there is connected one end of a conduit 69, to the other end of which there is connected a subspring 73 which also has a fluid chamber 77 and an air chamber 78 which are separated from one another by a diaphragm. And at an intermediate point of said conduit 69 there is likewise fitted a normally open type ON/OFF switching valve 65 which is controlled by an electrically operated motor 85. Thus, as the volume of the cylinder chamber 5 of this actuator 2fr for the rear right vehicle wheel varies in response to the bound and the rebound of said rear right vehicle wheel and air compressed therein is squeezed and unsqueezed, the fluid in said cylinder chambr 5 and in the fluid chambers 75 and 77 of this main spring 61 and this subspring 73 flows to and fro therebetween through the flow rate control valve 53, and the flow resistance caused thereby likewise produces a vibratory damping effect. Similarly, to a point on the conduit 31 intermediate between the electrically controlled flow rate control valve 29 and the actuator 2fl for the rear left vehicle wheel there is connected one end of a conduit 58, to the other end of which there is connected a main spring 62 which likewise has a fluid chamber 75 and an air chamber 76 which are separated from one another by a diaphragm, and at an intermediate point of said conduit 58 there is fitted a flow rate control valve 54 which is controlled by an electrically operated motor 82. And to a point on said conduit 58 between said flow rate control valve 54 and said main spring 62 there is connected one end of a conduit 70, to the other end of whcih there is connected a subspring 74 which has a fluid chamber 77 and an air chamber 78 which are separated from one another by a diaphragm. At an intermediate point of said conduit 70 there is fitted a similar normally open type ON/OFF switching valve 66 which is controlled by an electrically operated motor 86. Thus, as the volume of the cylinder chamber 5 of this actuator 2fl for the rear left vehicle wheel varies in response to the bound and the rebound of said rear left vehicle wheel and air compressed therein is squeezed and unsqueezed, the fluid in said cylinder chamber 5 and in the fluid chambers 75 and 77 of this main spring 62 and this subspring 74 similarly flows to and fro therebetween through the flow rate control valve 54, and the flow resistance caused thereby similarly produces a vibratory damping effect.

As will be particularly explained hereinafter, in all of the preferred embodiments of the vehicle height adjustment system of the present invention which will be described, the damping effect C for each of the four vehicle wheels is arranged to be switched between various levels according to control of the flow resistance of the flow rate control valves 51, 52, 53, and 54 by the associated respective electric motors 79, 80, 81, and 82. Also, the springing effect or spring rate, i.e. the modulus of elasticity of springing, of each of the four vehicle wheels is arranged to be switched between two levels—high and low—according to control of the opening and closing of the ON/OFF switching valves 63, 64, 65, and 66 by the associated respective electric motors 83, 84, 85, and 86. And, as will be described shortly, the electric motors 79, 80, 81, and 82 and the electric motors 83, 84, 85, and 86 are selectively drivingly energized and controlled by an electrical control device 102, according to signals which said electrical control device 102 receives from a vehicle road speed sensor 115, a steering angle sensor 113, a throttle position sensor, a braking sensor, and a shift position sensor if the vehicle is equipped with an automatic type transmission, so as to minimize nose dive, squat, and roll of the vehicle. Furthermore, vehicle height sensors 87, 88, 89, and 90 (each schematically illustrated as a variable resistor although other constructions therefor are possible) are provided respectively to the actuator 2fr for the front right vehicle wheel, the actuator 2fl for the front left vehicle wheel, the actuator 2rr for the rear right vehicle wheel, and the actuator 2rl for the rear left vehicle wheel, each functioning so as to sense the displacement of the piston 4 of its associated actuator (or of the suspension arm associated therewith) so as to produce an electrical output signal representative thereof, i.e. representative of the height of the generally corresponding portion of the vehicle body from the road surface; these electrical output signals are fed to the electrical control device 102. Further, for each of the pressure chambers 5 of the actuators 2fr, 2fl, 2rr, and 2rl for the vehicle wheels, there is provided a corresponding pressure sensor, respectively designated by the reference numerals 91 through 94, each of which senses the pressure of the working fluid within its corresponding pressure chamber 5 and produces an electrical output signal representative thereof, said electrical output signal being fed to the electrical control device 102. Accordingly, in this first preferred embodiment, information representative of the individual pressures in all of the four pressure chambers 5 is available to the electrical control device 102.

THE CONSTRUCTION OF THE ELECTRICAL CONTROL DEVICE 102

Referring now particularly to FIG. 2, the construction of the electrical control device 102 of the first preferred embodiment of the vehicle height adjustment system of the present invention, and of the micro computer designated as 103 incorporated therein, will be explained. This micro computer 103 may, as suggested in FIG. 2, be of per se conventional construction, and in such an exemplary case incorporates a CPU (central processing unit) 104, a ROM (read only memory) 105, a RAM (random access memory) 106, an input port device 107, and an output port device 108, all of these elements being linked together by way a two way common bus 109.

A vehicle height selection switch 110 is provided in the passenger compartment of the vehicle, capable of being accessed by the vehicle driver. This vehicle height selection switch 110 is settable to anyone of three positions, said three positions indicating that the driver desires the vehicle height to be either high (H), normal (N), or low (L), and outputs a signal representative of its setting to the input port device 107 and thus to the micro computer 103. The input port device 107 is also supplied, via a multiplexer 111 and an A/D converter 112, with signals representative of the actual current vehicle heights, designated hereinafter as Hfr, Hfl, Hrr, and Hrl, over the four vehicle wheels outputted by the aforementioned four vehicle height sensors 87, 88, 89, and 90 respectively therefor and amplified by respective amplifiers 87a, 88a, 89a, and 90a, with signals representative of the current pressures, designated hereinafter as Pfr, Pfl, Prr, and Prl, present in the pressure chambers 5 of the actuators 2fr, 2fl, 2rr, and 2rl respectively for the four vehicle wheels outputted by the aforementioned four pressure sensors 91, 92, 93, and 94 respectively therefor and amplified by respective amplifiers 91a, 92a, 93a, and 94a, with a signal representative of the vehicle road speed V outputted from the vehicle road speed sensor 115 and amplified by an amplifier 115a, with a signal representative of the steering angle α (considering turning to the right as positive) outputted from the setting angle sensor 113 and amplified by an amplifier 113a, and with a signal representative of the rate of change ω of the steering angle outputted by the steering angle change rate sensor 114 and amplified by an amplifier 114a. Further, in FIG. 2, there are schematically shown low band pass filters 91b through 94b which are interposed between the amplifiers 91a through 94a for the signals from the pressure sensors 91 through 94 and the multiplexer 111, as well as high band pass filters 91c through 94c which are connected between the outputs of said low band pass filters 91b through 94b, in parallel with direct connections from said outputs of said low band pass filters 91b through 94b to said multiplexer 111. This construction, however, is schematic, as in the first preferred embodiment of the present invention in fact the functions of these low band pass filters 91b through 94b and these high band pass filters 91c through 94c are provided by software programs for the micro computer 103, as will be explained in detail hereinafter, and thus these blocks in FIG. 2 do not actually, in this first preferred embodiment, correspond to any distinct physical structures. However, this should not be considered as being limitative of the present invention, since in other possible embodiments these low band pass filters 91b through 94b and high band pass filters 91c through 94c cuould be provided as actual electronic components, fitted in the system as illustrated in FIG. 2. The function of these components may be briefly summarized as follows. When the vehicle is travelling over a relatively rough or bumpy road, the values of the pressures Pfr, Pfl, Prr, and Prl present in the pressure chambers 5 of the actuators 2fr, 2fl, 2rr, and 2rl respectively for the four vehicle wheels, as outputted by the four pressure sensors 91, 92, 93, and 94 respectively therefor, will have relatively high level of high frequency components, and therefore the low band pass filters 91b through 94b are provided for filtering out and eliminating these high frequency components. Also, as will be described in detail below, the high band pass filters 91c through 94c are provided for enabling prediction of variations in the wheel heights from these actual pressures Pfr, Pfl, Prr, and Prl which are present in the cylinder chambers 5.

In the ROM 105 there are stored reference vehicle heights Hbhf and Hbhr, Hbnf and Hbnr, and Hblf and Hblr, Hbhf and Hbhr are respectively the desired or target vehicle body heights over the front wheels and over the rear wheels when the vehicle height selection switch 110 is set to high (H); Hbnf and Hbnr are respectively the desired or target vehicle body heights over the front wheels and over the rear wheels when the vehicle height selection switch 110 is set to normal (N); and Hblf and Hblr are respectively the desired or target vehicle body heights over the front wheels and over the rear wheels when the vehicle height selection switch 110 is set to low (L). Thus Hbhf>Hbnf>Hblf and also Hbhr>Hbnr>Hblr. Also in the ROM 105 there are stored values representing maps and values of various types which will be described hereinafter, as well as other constant values. The CPU 104 performs various calculations as will be described shortly, and based upon the results thereof selectively outputs control signals through the output port device 108 for controlling the drive motors 79 through 82 for the respective flow rate control valves 51 through 54 via D/A converters and amplifiers not particularly shown, for controlling the flow rate control valves 18, 32, 19, 33, 28, 39, 29, and 40 via respective D/A converters 117a through 117d and via respective amplifiers 119a through 119d, for controlling the ON/OFF switching valves 16, 34, 17, 35, 26, 41, 27, and 42 via respective D/A converters 118a through 118d and via respective amplifiers 120a through 120d, and for controlling the drive motors 83 through 86 for the respective ON/OFF switching valves 63 through 66 via D/A converters and amplifiers not particularly shown. Further, to the output port device 108 there is connected a display unit 116 which indicates to the vehicle driver whether or not the desired vehicle height set by said driver on the vehicle height selection switch 110 is currently high (H), normal (N), or low (L).

THEORETICAL DISCUSSION

Generally in a vehicle equipped with a wheel height adjustment device, even if the wheel height at the position corresponding to each wheel is constant, the vehicle body is not necessarily evenly supported by all of the four wheels with the loading imposed by the vehicle body being evenly distributed between said four vehicle wheels, but on the contrary it is possible for one wheel to be in a floating state with an unduly low loading being imposed thereon. Therefore it is not actually sufficient merely to control the supply and draining of working fluid to and from the cylinder chambers 5 during wheel height adjustment so that the deviation of the actual wheel height from the standard wheel height is approximately zero, and accordingly it is considered to be preferable that, as suggested above, even when the vehicle is travelling in a straight line the pressure of working fluid within the cylinder chambers should be detected by pressure sensors, and that the supply and draining of working fluid to and from the cylinder chambers 5 should be controlled so that the loading imposed upon each vehicle wheel should be a respective standard value. On the other hand, when the vehicle is travelling around a curve, it is considered to be preferable to predict the amount of roll of the vehicle body by the pressure variations of working fluid within the cylinder chambers 5, and to control the supply and draining of working fluid to and from said cylinder chambers 5 so that the vehicle roll amount is brought to be substantially zero.

Next the control of the supply and draining of working fluid to and from each cylinder chamber 5 is described in two cases.

TRAVELLING IN A STRAIGHT LINE

Feedback is applied to the actual vehicle height in the position corresponding to each vehicle wheel Hj(where "j" is "fr" for the front right wheel, "fl" for the front left wheel, "rr" for the rear right wheel, and "rl" for the rear left wheel) detected by the wheel height sensors 87 through 90 and the actual cylinder chamber pressures Pj detected by the pressure sensors 91 through 94, and by comparing these values with the standard wheel heights Hbj and the standard pressures Pbj, the opened or closed states of the electrically controlled on/off switching valves and the voltages and/or duty ratios of the actuating electrical energy supplies for the electrically controlled flow rate control valves are determined. Specifically, in each case for the actuator 2 for each vehicle wheel;

- if Hj is greater than Hbj, then the drain side valves are opened;
- if Hj is less than Hbj, then the supply side valves are opened;
- if Pj is greater than Pbj, then the drain side valves are opened;
- and, if Pj is less than Pbj, then the supply valves are opened.

The opened or closed state of these electrically controlled on/off switching valves and electrically controlled flow rate control valves are caused to balance the deviations in wheel height and the deviations in pressure, and the degrees of opening of the electrically controlled flow rate control valves are determined in accordance with the deviations in wheel heights and the deviation in pressures. Therefore the voltages Ej of the supply of actuating electrical energy to be supplied to each one of such electrically controlled flow rate control valves is given as in expression (a) below (if such a flow rate control valve is to be controlled by duty ratio control, like considerations apply, mutatis, mutandis):

$$Ej = -Kj(Hj - Hbj) - Lj(Pj - Pbj) \qquad (a)$$

(where Kj and Lj are positive constants).

Here, if the voltages of the supplies of actuating electrical energy to be supplied to the supply side and to the drain side electrically controlled flow rate control valves are denoted respectively as Einj and Eoutj, these are then expressed as follows:
- if Ej is greater than or equal to zero, then Einj = Ej and Eoutj = 0;
- if Ej is less than or equal to zero, then Einj = 0 and Eoutj = −Ej.

TRAVELLING AROUND A CURVE

When the vehicle is travelling around a curve, if without predictive control feedback control is applied to the actual wheel heights Hj and the actual cylinder pressures Pj, then, because of response delays in the hydraulic system, there will be transient temporary variations in wheel heigth, and as a result the vehicle body will be subject to rolling. In order positively to prevent this vehicle body rolling, it is preferably to predict changes in the wheel heights Hj from the cylinder pressures Pj, and, based on the results of such prediction and the deviations of the actual wheel heights from the standard wheel heights, to determine the voltages (or duty ratios) of the supplies of actuating electrical energy to be supplied to each of the electrically controlled flow rate control valves. If this concept is expressed algebraically, the result is equation (b) below:

$$Ej - Mj(Hj - Hbj) + (Ts/(1+Ts))Nj\ Pj \qquad (b)$$

where Mj and Nj are positive constants, s is the Laplacian, and T is a time constant.

As is per se well known, Ts/(1+Ts) in the equation (b) above is a high band pass filter. The reason for using a high band pass filter as this filter will now be explained. First a single wheel model as shown in FIG. 3 will be considered. In FIG. 3, 121 inidcates an actuator (one of the actuators 2, in the concrete realization provided by the first preferred embodiment of FIGS. 1 and 2) provided for the corresponding vehicle wheel 122, and this acturator 121 comprises a cylinder 123 and a piston 124 of the general types described above, which define a cylinder chamber 125. This cylinder chamber 125 of the cylinder 123 is connected to an working fluid supply source not shown in the drawing by a conduit 127 having intermediate therealong an electrically controlled flow rate control valve 126; a piston rod 128 of the piston 124 is pivoted to a suspension arm 129 to which the vehicle wheel 122 is rotatably mounted. Also connected to the conduit 127 between the cylinder 123 and the flow control valve 126, by menas of a branching conduit 130, there is provided a spring device 131. For the purposes of explanation this spring device 131, which actually of course is a hydraulic or pneumatic spring device, is shown as comprising a cylinder 132 and a piston 133 disposed so as to be reciprocally movable within the cylinder 132, and on one side of the piston 133 a spring chamber 134 is shown as being defined and as being connected with the conduit 130, whereas on the other side of the piston 133 there is shown disposed a compression coil spring 135. At an intermediate point in the conduit 130 is provided a throttle or flow restriction device 136.

In the model shown in FIG. 3, when the equations of motion are taken to a linear approximation the result is as follows.

$$X = A_3/A \qquad (1)$$

$$q_2 = Q(P_3 - P_2) \qquad (2)$$

$$k \cdot y = P_2 \cdot a \qquad (3)$$

$$a \cdot y = q_2 \qquad (4)$$

$$q_2 + q_3 = Gv \cdot E \qquad (5)$$

Here x represents the relative mutual displacement between the cylinder 123 and the piston 124, A represents the cross sectional area of the cylinder chamber 125, y represents the relative displacement (virtual) between the cylinder 132 and the piston 133, a represents the cross-sectional area (virtual) of the spring chamber 134, q2 represents the flow rate of working fluid into the spring chamber 134, q3 represents the flow rate of working fluid into the cylinder chamber 125, p2 represents the pressure within the spring chamber 135, p3 represents the pressure within the cylinder chamber 125, k represents the spring constant (virtual) of the spring 135, C represents the flow passage coefficient of the throttle 136, E represents the voltage (or duty ratio, if such be the control method) of the actuating electrical energy supplied to the flow control valve 126 (when positive the supply side flow control valve is open, when negative the drain side flow control valve is open), and Gv represents the gain of said flow control valve 126.

By eliminating y from the equations (1) to (5), and then further eliminating q2 and q3, the following equation is obtained, with s as the Lapacian:

$$x \frac{Gv}{A} \cdot \frac{E}{s} - \frac{1}{\frac{A^2}{a^2}k + \frac{A^2}{C}s} P_3$$

If in the above we replace $A^2/C$ by C and $(A^2/a^2)$ by K, then the above equation is reduced to the following equation (6):

$$x = \frac{Gv}{A} \cdot \frac{E}{s} - \frac{1}{K + Cs} P_3 \qquad (6)$$

Here C is the equivalent damping coefficient, and K is the equivalent spring constant.

In order that the vehicle body rolling should be zero, x should be equal to 0, in other words the right hand side of the equation (6) above should be 0. Therefore:

$$E = \frac{A^2}{CGv} \cdot \frac{\frac{C}{K}s}{1 + \frac{C}{K}s} P_3 \qquad (7)$$

In this equation (7), the expression:

$$\frac{C}{K}s / \left(1 + \frac{C}{K}s\right)$$

is the high band pass filter for the time constant T = C/K. Therefore, in order to eliminate transient fluctuations in the wheel heights and in order to prevent the occurrence of vehicle rolling, the signals derived by passing the signal from the cylinder chamber pressures through a high band pass filter are required.

THE OPERATION OF THE FIRST PREFERRED EMBODIMENT

Referring next to the flow charts shown in FIG. 4, the operation of the micro computer 103 incorporated in the first preferred embodiment of the system for vehicle roll control of the present invention as shown in gross detail in FIGS. 1 and 2 will be explained.

First, in the step 1, the ignition switch of the vehicle is switched on, and, with the vehicle stationary, the pressures in the cylinder chambers 5 of the various actuators 2 are read in and are set up as the standard cylinder chamber pressures Pbfr, Pbfl, Pbrr and Pbrl, and thereafter the flow of control passes next to the step 2.

In the step 2, a signal for the switch function S input from the wheel height selection switch 110 is read in, and thereafter the flow of control passes next to the step 3.

In the step 3, a test is made as to whether the switch function S for indicating the ride height for the vehicle is set to high, and if S is not set to high then the flow of control passes next to the step 4, wheres if S is set to high then the flow of control passes next to the step 5.

In the step 4, a test is made as to whether the switch function S is set to low, and when a decision is made that S is not set to low then the flow of control passes next to the step 6, whereas when a decision that S is set to low is made then the flow of control passes next to the step 7.

In the step 5, the standard wheel heights Hbfr, Hbfl, Hbrr and Hbrl for the front right wheel, the front left wheel, the rear right wheel and the rear left wheel are set respectively to the values Hhf, Hhf, Hhr and Hhr, and thereafter the flow of control passes next to the step 8.

In the step 6, said standard wheel heights Hbfr, Hbfl, Hbrr and Hbrl are set respectively to the values Hnf, Hnf, Hnr and Hnr (as remarked before, Hnf is less than Hhf and Hnr is less than Hhr), and thereafter the flow of control passes next to the step 8.

In the step 7, said standard wheel heights Hbfr, Hbfl, Hbrr and Hbrl are set respectively to the values Hlf, Hlf, Hlr and Hlr (as remarked before, Hlf is less than Hnf and a fortiori less than Hhf, and Hlf is less than Hnr and a fortiori less than Hhr), and thereafter the flow of control passes next to the step 8.

In the step 8 to which the flows of control thus all converge, signals representing the actual wheel heights Hj (where "j" is "fr" for the front right wheel, "fl" for the front left wheel, "rr" for the rear right wheel, and "rl" for the rear left wheel) input from the wheel height sensors 87 to 90, signals representing the actual cylinder chamber pressures Pj input from the pressure sensors 91 to 94, signals representing the modified cylinder chamber pressures theta j input from the pressure sensors 91 to 94 through the high band pass filters 91c to 94c (or simulated by software), and a signal representing the steering angle $\alpha$, a signal representing the steering angle rate of change $\omega$, and a signal representing the vehicle speed V, input respectively from the steering angle sensor 113, the steering angle rate of change sensor 114, and the vehicle speed sensor 115, are read in to the micro computer 103; and thereafter the flow of control passes next to the step 9.

Next in the step 9, a test is made as to whether or not the absolute value of the vehicle speed V is less than a control threshold value V0 (which is a positive constant close to zero), and if a decision is made that the absolute value of V is less than V0 then the flow of control passes next to the step 12, whereas if a decision is made that the absolute value of V is not less than V0 then the flow of control passes next to the step 10.

In the step 10, a test is made as to whether the absolute value of the steering angle $\alpha$ is less than a control threshold value $\alpha$ (which is a positive constant close to zero), and if a decision is made that the absolute vale of the steering angle $\alpha$ is less than $\alpha$, the flow of control passes next to the step 11, whereas if a decision is made that the absolute value of the steering angle $\alpha$ is not less than $\alpha$ then the flow of control passes next to the step 13.

In the step 11, a test is made as to whether the absolute value of the steering angle rate of change $\omega$ is less than a control threshold value $\omega$ (which is a positive constant close to zero), and if a decision is made that the absolute value of the ssteering angle rate of change $\omega$ is less than $\omega$, then the flow of control passes next to the step 12, whereas if a decision is made that the absolute value of the steering angle rate of change $\omega$ is not less than $\omega$ then the flow of control passes next to the step 13.

In the step 12, the voltage Ej of the actuating electrical energy to be supplied to each of the flow control valves is computed according to the following expression, and thereafter the flow of control passes next to the step 14.

$$Ej = -Kj(Hj - Hbj) - Lj(Pj - Pbj)$$

(where "j" is "fr" for the front right wheel, "fl" for the front left wheel, "rr" for the rear right wheel, and "rl" for the rear left wheel)

In the step 13, the voltage Ej of the actuating electrical energy to be supplied to ech of the flow control valves (or the duty ratio, in orther implementations) is computed according to the following expression, and thereafter the flow of control passes next to the step 14.

$$Ej = -Mj(Hj - Hbj) + Nj\theta j$$

(where "j" is "fr" for the front right wheel, "fl" for the front left wheel, "rr" for the rear right wheel, and "rl" for the rear left wheel, and $\theta j = Ts/(1+Ts)Pj$)

In the step 14, if the voltage Ej of the actuating electrical energy to be supplied to each of the flow control valves is zero or is positive, then the voltage Einj of the actuating electrical energy to be supplied to the respective one of the supply side flow control valves 18, 19, 28 and 29 is set to said appropriate Ej, and the voltage Eoutj of the actuating electrical energy to be supplied to the respective one of the drain side flow control valves 32, 33, 39 and 40 is set to zero; whereas, if on the other hand the voltage Ej is negative, then the voltage Einj of the actuating electrical energy to be supplied to the respective one of the supply side flow control valves is set to zero and the voltage Eoutj of the actuating electrical energy to be supplied to the respective one of the drain side flow control valves is set to minus said appropriate Ej (so as to be positive), and thereafter the flow of control passes next to the step 15.

In the step 15, an actuating electrical signal with a voltage of Einj or Eoutj is set to the solenoid sof those of the flow control valves only which are to be supplied with actuating electrical signals of which the voltage is positive, and by, after a short time has elapsed, energizing the corresponding electrically controlled on/off switching valve for a certain time, a certain amount of working fluid is supplied to the cylinder chamber 5 of the corresponding actuator 2 or alternatively a certain amount of working fluid is drained from said cylinder chamber 5, whereby the wheel height adjustment is carried out. After the step 15 is completed, the flow of control returns to the step 2, and thereafter the steps 2 to 15 are repeatedly executed in a closed loop until the ignition switch of the vehicle is turned off.

Thus, according to this first preferred embodiment of the present invention, at the same time as controlling the supply of working fluid to or the draining of working fluid from the cylinder chamber 5 of each actuator 2 based on the deviations between the actual wheel heights and the standard wheel heights as set according to the setting of the wheel height selection switch 110, in the case that the vehicle speed is less than V0, i.e. is close to stationary, or in the case of straight line travel, the flow of working fluid being supplied to each cylinder chamber 5 or being drained from each cylinder chamber 5 is corrected according to the deviation of the actual cylinder chamber pressure of each actuator 2 as detected by the pressure sensors 91 to 94 from a standard cylinder chamber pressure. On the other hand, in the case that the vehicle is turning around a curve, the flow of working fluid being supplied to each cylinder chamber 5 or being drained from each cylinder chamber 5 is corrected based on the actual pressure value in each cylinder chamber 5 as detected by the pressure sensors 91 to 94 and as passed through the high band pass filters 91c to 94c, as a result of which, in the exemplary case that the vehicle is travelling in a straight line, the wheel height can be adjusted to the standard wheel height without any likelihood of the occurrence of a state in which one wheel is floating and is preferentially relieved of loading. Thus, in such a case that the vehicle is travelling around a curve, for example, the wheel heights can be maintained at the standard wheel heights while thus positively preventing vehicle rolling.

A VARIATION

Figure 4:
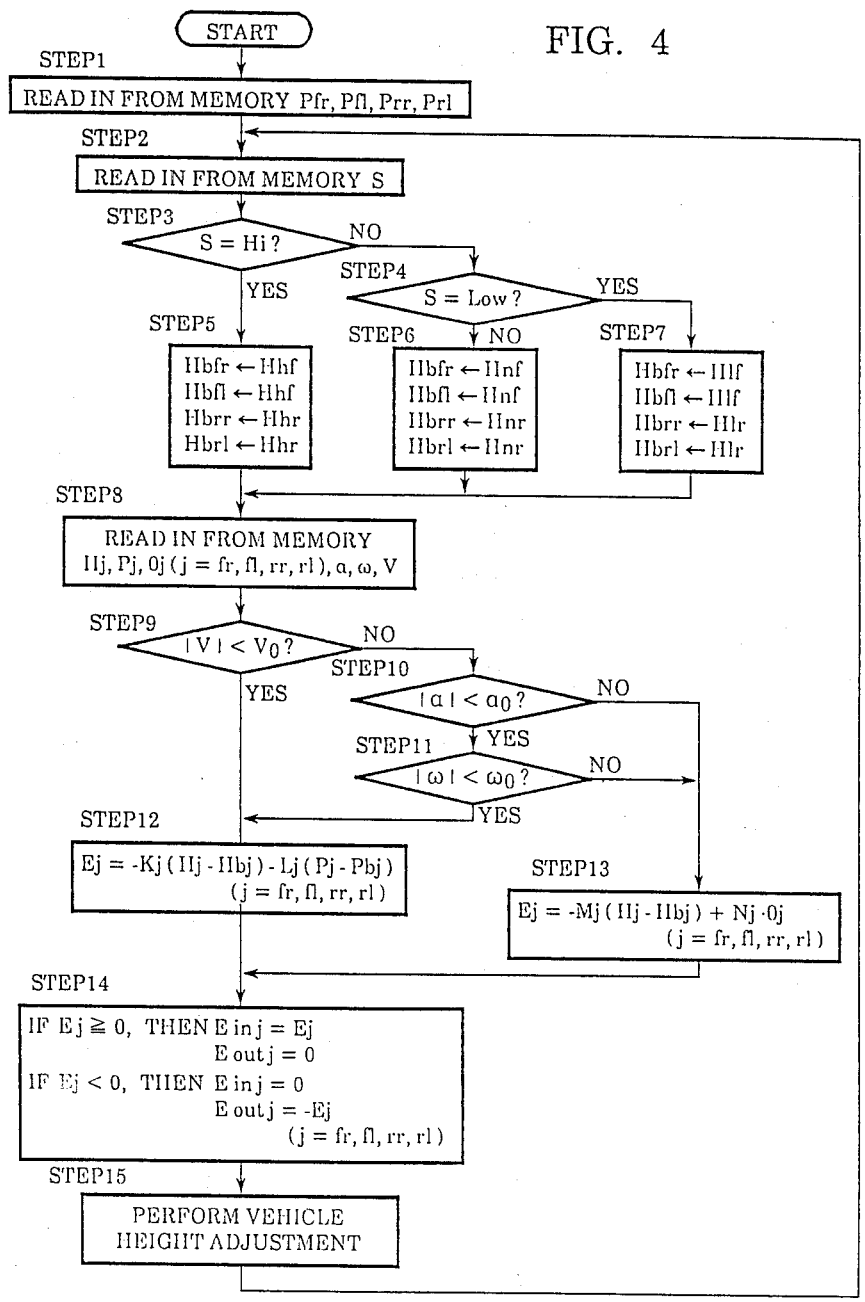
FIG. 4 is a flow chart showing the overall flow of a cyclical program which directs the operation of said micro computer utilized in the first preferred embodiment of the vehicle height adjustment system of the present invention.
Figure 5:
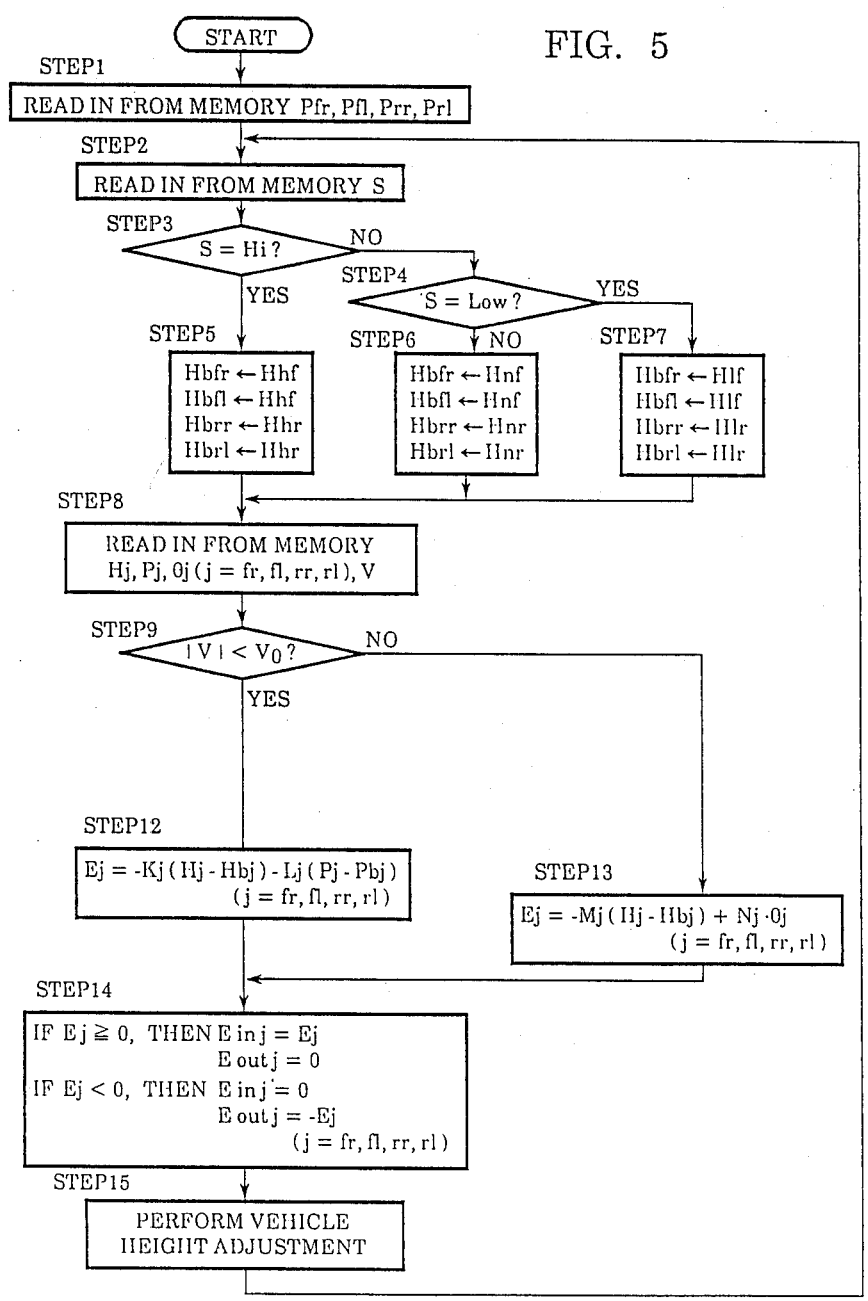
FIG. 5 is a flow chart, similar to FIG. 4, showing the overall flow of a cyclical program which directs the operation of a micro computer utilized in a variation of said first preferred embodiments of the present invention.

FIG. 5 presents an amended example of the flow chart shown in FIG. 4, relating to a variation of this first preferred embodiment of the vehicle height adjustment system of the present invention. If FIG. 5, it should be noted that steps which are the same as or are substantially equivalent to steps shown in FIG. 4 are denoted by the same step numbers.

In the flow chart shown in FIG. 5, in the step 8, reading in of the signals for the steering angle α and the steering angle rate of change ω is not carried out. Also, no steps corresponding to the step 10 and the step 11 in the flow chart shown in FIG. 4 are executed, and therefore, in the step 9, when a decision is made that the absolute value of V is not less than V0, control goes to the step 13.

On the other hand, in this variational example, when a decision that the absolute value of V is less than V0 is made in the step 9, the step 12 is executed, and when a decision is made that the absolute value of V is not less than V0, step 13 is executed, and therefore the adjustment of the wheel height to the standard wheel height without the possibility of the occurrence of a state in which one wheel only is floating is only carried out in the case that the vehicle speed is less than V0, but, in the case that the vehicle speed is at least V0, not only is roll positively prevented while maintaining the wheel heights at the standard wheel heights, but also vehicle pitching, for example squat when the vehicle is undergoing sudden acceleration and nose dive when the vehicle is undergoing sudden deceleration, are also positively prevented.

According to the flow chart of whichever one of the control processes of FIG. 4 and FIG. 5 is carried out, the wheel heights are controlled to the standard wheel heights, and rolling of the vehicle body is effectively prevented, but when the vehicle is travelling round a corner there is, strictly speaking, a remaining tilt that occurs to the vehicle body, because of the flexing of the tires thereof.

The tire flexing c may be expressed as follows, if the spring constant of the tires is deonted as kt, the pressure coefficient of the tires is denoted as ξ, and if the compression direction is positive:

$$e = \frac{A}{k_t}(PJ - Pbj)$$
$$= \epsilon(PJ - Pbj)$$

(where "j" is "fr" for the front right wheel, "fl" for the front left wheel, "rr" for the rear right wheel, and "rl" for the rear left wheel)

Therefore, replcing the calculation of the program step 13 of the flow chart shown in FIG. 4 and FIG. 5 by:

$$Ej = -Mj\{[Ij - Hbj - \#j(Pj - Pbj)] + NjOj$$

(where "j" is "fr" for the front right wheel "fl" for the front left wheel, "rr" for the rear right wheel, and "rl" for the rear left wheel) not only can the wheel heights be controlled to the standard values, but also rolling of the vehicle body (in the case that the amendment is made to the flowchart of FIG. 5, both rolling and pitching) can be substantially completely prevented.

THE SECOND PREFERRED EMBODIMENT

Figure 6:
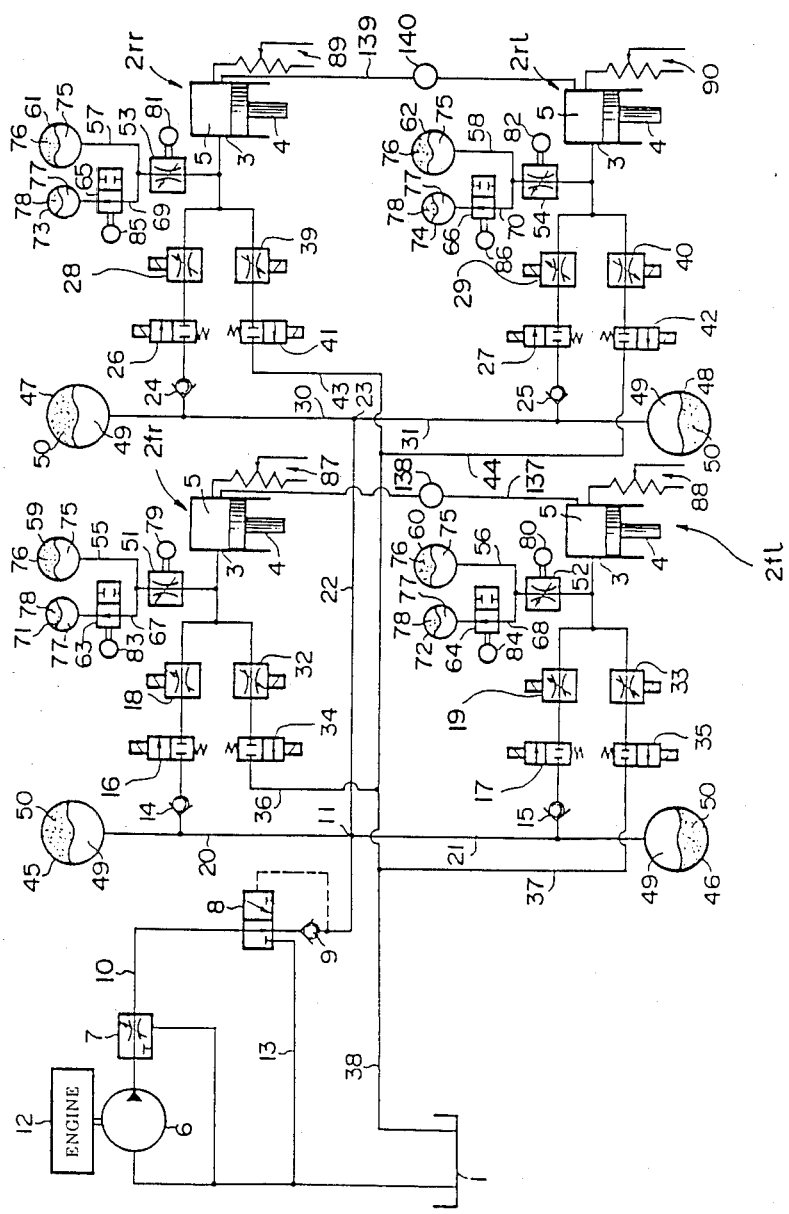
FIG. 6 is a schematic structural diagram, similar to FIG. 1 for the first preferred embodiment, showing major physical components of the second preferred embodiment of the system for vehicle height adjustment for an automotive vehicle of the present invention.
Figure 7:
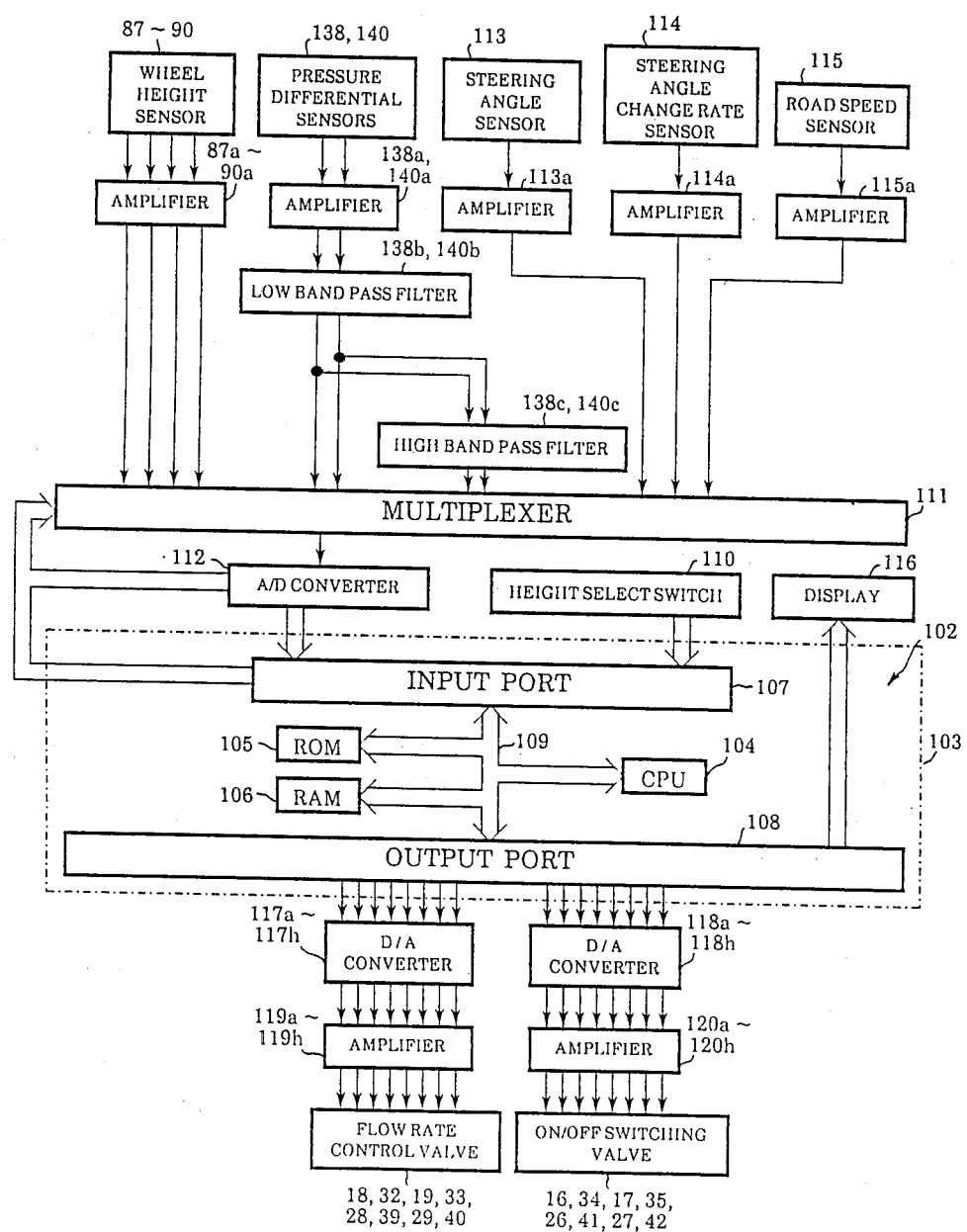
FIG. 7 is an idealized block diagrammatical view, similar to FIG. 2 for the first preferred embodiment, showing the internal construction of an electrical control device of a type incorporated in said second preferred embodiment of the present invention, also incroporating a micro computer.
Figure 8:
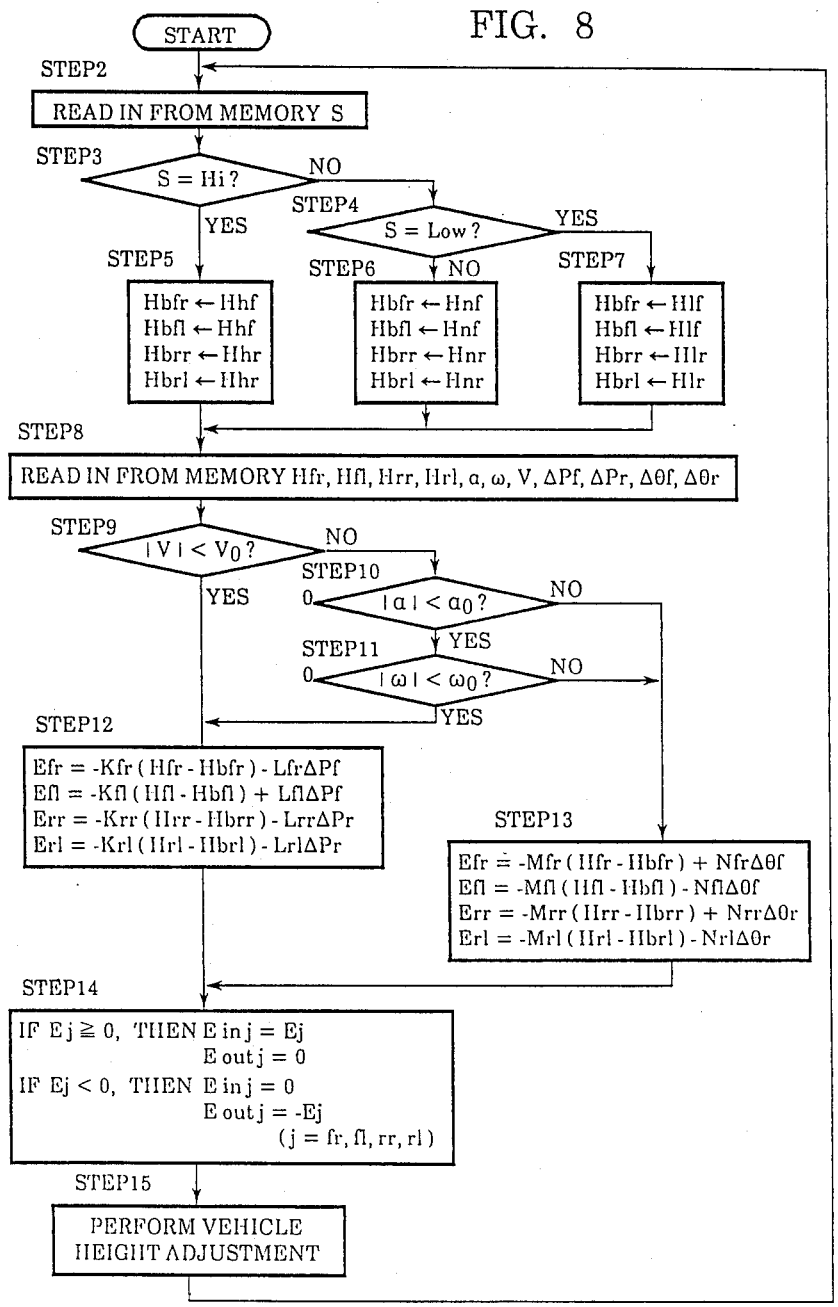
FIG. 8 is a flow chart, similar to the FIG. 4 flow chart for the first preferred embodiment and to FIG. 5 for the variational embodiment thereof, showing the overall flow of a cyclical program which directs the operation of said micro computer utilized in said second preferred embodiment of the vehicle height adjustment system of the present invention.

The schematic structural view of FIG. 6 and the block diagrammatical view of FIG. 7 are for showing the gross construction of the suspension system and of the electrical control device incorporating a micro computer related to the second preferred embodiment of the system for vehicle roll control of the present invention, and respectively correspond to FIGS. 1 and 2 relating to the first preferred embodiment; and further the flow chart of FIG. 8 shows the overall program flow, like FIG. 4 for the first preferred embodiment. Elements and so on in these figures relating to this second preferred embodiment which correspond to elements and so on in the figures relating to the first preferred embodiment are denoted by the same reference symbols as were used in said figures.

In this second preferred embodiment, the cylinder chambers 5 of each of the pair of actuators 2fr and 2fl for the front vehicle wheels are mutually connected together by a conduit 137, at an intermediate point along which there is provided a pressure differential sensor 138 which detects the difference in pressure between the two pressure chambers 5 and produces an output signal representative thereof. Similarly, the pressure chambers 5 of each of the pair of actuators 2rr and 2rl for the rear wheels are mutually connected together by a conduit 139, at an intermediate point along which there is provided a pressure differential sensor 140 which detects the difference in pressure between the two pressure chambers 5 and produces an output signal representative thereof. It should be noted that, provided that the pressure differential sensors 138 and 140 are capable of detecting the pressure differences between the pressure chambers of their respective pairs of actuators, they may be of any construction, and particularly for example may be pressure differential sensors such as shown in FIG. 3 of Japanese Patent Application Serial No. Sho 60-235651 (1985), being an application filed by an applicant the same as one of the applicants or assignees or entities owed duty of assignment of the present patent application.

As shown in FIG. 7, the output signals from the pressure differential sensors 138 and 140 are inputted through respective amplifiers 138a and 140a, through respective low band pass filter 138b and 140b, and through the multiplexer 111 and the A/D converter 112, to the input port device 107, and also are inputted in parallel through said respective amplifiers 138a and 140a, said respective low band pass filters 138b and 140b, and further through respective high band pass filters 138c and 140c and through said multiplexer 111 and said A/D converter 112, to said input port device 107. As before, these low and high band pass filters 138b, 140b, 138c, and 140c need not actually correspond to any actual physical components, but may be simulated in software on the micro computer 103.

THEORETICAL DISCUSSION

The expressions (a) and (b) presented above will now be presented again as separated for the right side (r) and the left side (l):

$$\left. \begin{array}{l} Er = -Kr(Hr - Hbr) - Lr(Pr - Pbr) \\ El = -Kl(Hl - Hbl) - Ll(Pl - Pbl) \end{array} \right\} \quad (a')$$

$$\left. \begin{array}{l} Er = -Mr(Hr - Hbr) + \dfrac{Ts}{1 + Ts} NrPr \\ El = -Ml(Hl - Hbl) + \dfrac{Ts}{1 + Ts} NlPl \end{array} \right\} \quad (b')$$

If the detected differential pressure is represented as 2 α P (with the sign positive if the pressure is greater on the right hand side of the vehicle), and the average pressure of the right and left pressure chambers 5 is denoted as $\overline{P}$ (a constant), then:

$$Pr = \overline{P} + \Delta P$$

$$Pj = \overline{P} - \Delta P$$

$$Pbr = Pbj = \overline{P}$$

and the expressions (a') and (b') can be rewritted as (a'') and (b'') below. As will be seen from the expressions below, the value of $\overline{P}$ is eliminated, and only the differential pressure ΔP remains:

$$\left. \begin{array}{l} Er = -Kr(Hr - Hbr) - Lr \Delta P \\ El = -Kl(Hl - Hbl) + Ll \Delta P \end{array} \right\} \quad (a'')$$

-continued $$\left. \begin{array}{l} Er = -Mr(Hr - Hbr) + \dfrac{Ts}{1 + Ts} Nr \Delta P \\ El = -Ml(Hl - Hbl) - \dfrac{Ts}{1 + Ts} Nl \Delta P \end{array} \right\} \quad (b'')$$

Therefore, in this second preferred embodiment whose gross physical structure is shown in FIG. 6 and FIG. 7, control is carried out based on these expressions.

OPERATION

Now, the operation of the micro computer 103 incorporated in this second preferred embodiment of the system for vehicle roll control of the present invention will be explained. As before, it will easily be understood that the FIG. 8 program flow is a repetitive cycle which will typically take place over a certain characteristic approximate cycle time. It should be noted that in FIG. 8 steps corresponding to steps of the flow charts laid out in FIG. 4 and FIG. 5 have the same step numbers attached as in those figures.

In the flow chart shown in FIG. 8, no step corresponding to the step 1 in the flow charts shown in FIG. 4 and FIG. 5 is executed, and instead the flow of control begins at the step 2. The steps 2 to 7 are the same as the corresponding steps in the flow charts shown in FIG. 4 and FIG. 5 and accordingly will not be descanted upon particularly herein; and, in the step 8 executed after the steps 5, 6 and 7, there are read into the micro computer 103 the following signals: signals representing the actual wheel heights Hfr, Hfl, Hrr, and Hrl as input from the wheel height sensors 87 to 90; a signal representing the steering angle α as input from the steering angle sensor 113; a signal representing the steering angle rate of change ω as input from the steering angle rate of change sensor 114; a signal representing the vehicle speed V as input from the vehicle speed sensor 115; signals representing the pressure differential ΔPf between the pressures in the pressure chambers 5 of the pair of actuators for the front wheels and the pressure differential ΔPr between the pressures in the pressure chambers 5 of the pair of actuators for the rear wheels as respectively input from the pressure differential sensors 138 and 140; and signals representing said same pressure differentials Δθf and Δθr between said pressures in said pressure chambers as respectively input from the differential pressure sensors 138 and 140 through the high band pass filters 138c and 140c. Thereafter, the flow of control passes next to the step 9.

The steps 9, 10 and 11 are the same as the corresponding steps in the flow chart shown in FIG. 4, and in the step 12, which is executed after the step 9 or the step 11, the voltages Efr, Efl, Err and Erl for the actuating electrical energy to be supplied to each of the electrically controlled flow rate control valves 18, 19, 28 and 29 are computed according to the following expressions based on the expression (a'') above:

$$Efr = -Kfr(Hfr - Hbfr) - Lfr\Delta Pf$$

$$Efl = -Kfl(Hfl - Hbfl) + Lfl\Delta Pf$$

$$Err = -Krr(Hrr - Hbrr) - Lrr\Delta Pr$$

$$Erl = -Krl(Hrl - Hbrl) + Lrl\Delta Pr$$

On the other hand, in the alternative step 13, the voltages for the actuating electrical energy to be supplied to each of the electrically controlled flow rate control valves 18, 19, 28 and are computed according to the following expressions based on expression (b") above.

$$Efr = -Mfr(Hfr-Hbfr)+Nfr\Delta\theta f$$

$$Efl = -Mfl(Hfl-Hbfr)-Nfl\Delta\theta f$$

$$Err = -Mrr(Hrr-Hbrr)+Nrr\Delta\theta r$$

$$Erj = -Mri(Hrl-Hbrl)-Nrl\Delta\theta r$$

The steps 14 and 15 are the same as the corresponding steps in the flow charts shown in FIG. 4 and FIG. 5, and accordingly details thereof will be omitted in the interests of brevity of disclosure. After the wheel height adjustment has been carried out in the step 15, the steps 2 to 15 are repeatedly executed in a closed loop, as long as the vehicle ignition switch is left as switched on.

Thus, in this second preferred embodiment, at the same time as controlling the supply and drain of fluid to the pressure chamber 5 of each actuator 2 based on the deviations of the actual wheel heights from the standard wheel heights as set by the wheel height selection switch 110, when the vehicle speed is less than V0, and the vehicle is close to stationary, or when the vehicle is travelling in a striaght line, the flow rate of fluid supplied to each pressure chamber 5 or drained from each pressure chamber 5 is corrected based on the pressure differential detected by the pressure differential sensors (the deviations between the averages of the left and right pressure chamber pressures as the actual pressure chamber pressures and the standard pressure chamber pressures), and in the case that the vehicle is turning the flow rate of fluid supplied to each pressure chamber 5 or drained from each pressure chamber 5 is corrected based on the pressure differential detected by the pressure differential sensors and passed through a high band pass filter, as a result of which the wheel heights can be controlled to the standard wheel heights without occurrence of the state in which when the vehicle is travelling along a straight line one wheel only is in the above described floating condition, and also, while the vehicle is travelling along a curve, while maintaining the wheel heights at the standard wheel heights, vehicle rolling can be positively presented.

It should be noted that in the case of this second preferred embodiment a correction may also be made to consider the flexing of the tires. If the direction of compression of the tires is positive, then, representing the flexing of the tires of the right wheels as $\xi\Delta P$, and the flexing of the tires of the left wheel as $-\xi\Delta P$, the expression for the calculation carried out in the step 13 of the flow chart shown in FIG. 8 should be replaced by the following:

$$Efr = -Mfr(Hfr-Hbfr-\xi f\Delta Pf)+Nfr\Delta\theta f$$

$$Efl = -Mfl(Hfl-Hbfl+\xi f\Delta Pf)-Nfl\Delta\theta f$$

$$Err = -Mrr(Hrr-Hbrr-\xi r\Delta Pr)+Nrr\Delta\theta r$$

$$Erl = -Mrl(Hrl-Hbrl+\xi r\Delta Pr)-Nrl\Delta\theta r$$

CONCLUSION

In the above embodiments the loading detection means detecting the loading of each vehicle wheel (i.e. the weight force which said wheel is required to support) was a pressure sensor detecting the pressure within the pressure chamber of each actuator or a differential pressure sensor detecting the differential pressure between left and right actuator pressure chambers, but in alternative embodiments such loading detection means may be any detection means, provided that said means is capable of detecting the loading of each vehicle wheel, and such loading detection means may for example be constituted by load cells or the like provided to the piston rods of the actuators. Other modifications are also possible. Thus, although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a vehicle comprising a body and a plurality of wheels upon which said vehicle runs, a vehicle height adjustment system, comprising:
    (a) a corresponding plurality of actuator assemblies, each corresponding to one of said vehicle wheels and resiliently suspending said one of said vehicle wheels from the vehicle body, each said actuator assembly comprising a pressure chamber and increasing and decreasing vehicle height at a location corresponding to each said vehicle wheel as a result of supply and discharge of working fluid to and from each said pressure chamber;
    (b) a corresponding plurality of working fluid supplying and discharging means, each corresponding to one of said actuator assemblies, for supplying and discharging working fluid to and from each pressure chamber;
    (c) a corresponding plurality of loading detection means, each corresponding to one of said vehicle wheels, for sensing each parameter representative of the loading imposed by the vehicle body on each corresponding one of said vehicle wheels;
    (d) a corresponding plurality of vehicle height detection means, each corresponding to one of said vehicle wheels, for sensing each parameter representative of the height of the vehicle body over each corresponding one of said vehicle wheels; and
    (e) a computing and control means for controlling said working fluid supplying and discharging means based on each deviation of each actual vehicle height as detected by each said vehicle height detection means from a standard vehicle height at each said vehicle wheel, and carrying out each control adjustment of each said actual vehicle height to each said standard vehicle height, while also carrying out a correction to the adjustment control of each said working fluid supplying and discharging means, based upon each deviation of each said actual wheel loading as detected by each said loading detection means from a standard wheel loading for each said vehicle wheel, by an amount substantially sufficient to eliminate each said loading deviation.

2. A vehicle height adjustment system according to claim 1, wherein each said loading detection means, for each said working fluid supplying and discharging means, is a pressure detecting means which detects the pressure within said pressure chamber of one of said working fluid supplying and discharging means as the fluctuation corresponding to the loading of the corresponding vehicle wheel.

3. For a vehicle comprising a body and a plurality of wheels upon which said vehicle runs, a vehicle height adjustment system, comprising:
(a) a corresponding plurality of actuator assemblies, each corresponding to one of said vehicle wheels and resiliently suspensing said one of said vehicle wheels from the vehicle body, each said actuator assembly comprising a pressure chamber and increasing and decreasing vehicle height at a location corresponding to each said vehicle wheel as a result of supply and discharge of working fluid to and from each said pressure chamber;
(b) a corresponding plurality of working fluid supplying and discharging means, each corresponding to one of said actuator assemblies, for supplying and discharging working fluid to and from each pressure chamber;
(c) a corresponding plurality of loading detection means, each corresponding to one of said vehicle wheels, for sensing each parameter representative of the loading imposed by the vehicle body on each corresponding one of said vehicle wheels;
(d) a corresponding plurality of vehicle height detection means, each corresponding to one of said vehicle wheels, for sensing each parameter representative of the height of the vehicle body over each corresponding one of said vehicle wheels; and
(e) a computing and control means for controlling said working fluid supplying and discharging means based on each deviation of each actual vehicle height as detected by each said vehicle height detection means from a standard vehicle height at each said vehicle wheel, and carrying out each control adjustment of each said actual vehicle height to each said standard vehicle height, while also carrying out a correction to the adjustment control of each said working fluid supplying and discharging means: when the road speed of said vehicle is less than a predetermined value, based upon each deviation of each said actual wheel loading for each said vehicle wheel, by an amount substantially sufficient to eliminate each deviation of each actual wheel loading as detected by each said loading detection means from a standard wheel loading for each said vehicle wheel.

4. A vehicle height adjustment system according to claim 3, wherein said computing and control means carries out a correction to the adjustment control of said working fluid supplying and discharge means when the road speed of said vehicle is less than a predetermined value, or when the road speed of said vehicle is less than a predetermined value and also the vehicle is substantially travelling along a straight line, said computing and control menas carries out a correction to the adjustment control of each said working fluid supplying and discharging means based upon each deviation of each actual wheel loading as detected by each said loading detection means from a standard wheel loading for each said vehicle wheel, by an amount substantially sufficient to eliminate each said loading deviation; and, when the road speed of said vehicle is greater than said predetermined value and also the vehicle is substantially travelling along a curve, said computing and control means carries out a correction to the adjustment control of each said working fluid supplying and discharging means based upon each loading signal obtained by passing signals through high band pass filters to eliminate transient fluctuations to indicate each actual wheel loading as detected by each said loading detection means, by an amount substantially sufficient to eliminate each deviation of each said actual wheel loading as detected by each said loading detection means from a standard wheel loading for each said vehicle wheel.

5. A vehicle height adjustment system according to claim 3, said vehicle having tires, wherein, when the road speed of said vehicle is greater than said predetermined value, said computing and control means derives a value representing the flexion amounts of said tires based on signals indicating each deviation of each actual wheel loading as detected by each said loading detection means from a standard wheel loading for each said vehicle wheel, fixes as new standard wheel heights the sums of the previous standard wheel heights and said values representing the flexion amounts of said tires, and carries out a correction to the adjustment control of each said working fluid supplying and discharging means based upon each loading signal obtained by passing signals through high band pass filters to eliminate transient fluctuations to indicate each actual wheel loading as detected by each said loading detection means, and based upon a signal indicating an amount substantially sufficient to compensate for said tire flexion.

6. A vehicle height adjustment system according to claim 3, said vehicle having tires, wherein, when the road speed of said vehicle is less than said predetermined value, or when the road speed of said vehicle is less than a predetermined value and also the vehicle is substantially travelling along a straight line, said computing and control means carries out a correction to the adjustment control of each said working fluid supplying and discharging means based upon each deviation of each actual wheel loading as detected by each saidloading detection means from a standard wheel loading for each said vehicle wheel, by an amount substantially sufficient to eliminate each said loading deviation; and, when the road speed of said vehicle is greater than said predetermined value and also the vehicle is substantially travelling along a curve, said computing and control means derives a value representing the flexion amounts of said tires based on signals indicating each deviation of each actual wheel loading as detected by each said loading detection means from a standard wheel loading for each said vehicle wheel, fixes as new standard wheel heights the sums of the previous standard wheel heights and said values representing the flexion amounts of said tires, and carries out a correction to the adjustment control of each said working fluid supplying and discharging means based upon each loading signal obtained by passing signals through high band pass filters to eliminate transient fluctuations to indicate each actual wheel loading as detected by each said loading detection means, and based upon a signal indicating an amount substantially sufficient to compensate for said tire flexion.

7. A vehicle height adjustment system according to claim 3, wherein each said loading detection means, for each said working fluid supplying and discharging means, is a pressure detecting means which detects the pressure within said corresponding pressure chamber of said working fluid supplying and discharging means as a fluctuation corresponding to the loading of the corresponding vehicle wheel.

8. A vehicle height adjustment system according to claim 3, wherein each said loading signal is obtained by passing said loading signals through high band pass filters when the road speed of said vehicle is greater than said predetermined value to eliminate transient fluctuations to indicate each actual wheel loading as detected by each said loading detection means.

9. For a vehicle comprising a body and a plruality of wheels upon which said vehicle runs, a vehicle height adjustment system, comprising:
(a) a corresponding plurality of actuator assemblies, each corresponding to one of said vehicle wheels and resiliently suspending each one of said vehicle wheels from the vehicle body, each said actuator assembly comprising a pressure chamber and increasing and decreasing vehicle height at a location corresponding to one of said vehicle wheels as a result of supply and discharge of working fluid to and from said corresponding pressure chamber;
(b) a corresponding plurality of working fluid supplying and discharging means, each corresponding to one of said actuator assemblies, for supplying and discharging working fluid to and from said corresponding pressure chambers;
(c) a means for detecting the differential pressure chambers of at least one left and right pair of said actuator assemblies;
(d) a corresponding plurality of vehicle height detection means, each corresponding to one of said vehicle wheels, for sensing each parameter representative of the height of the vehicle body over each corresponding one of said vehicle wheels; and
(e) a computing and control means for controlling said working fluid supplying and discharging means based on each deviation of each actual vehicle height as detected by each said vehicle height detection means from a standard vehicle height at each said vehicle wheel, and carrying out each control adjustment of each said actual vehicle height to each said standard vehicle height, and, when the road speed of said vehicle is less than a predetermined value, said computing and control means carries out a correction to the adjustment control of each said working fluid supplying and discharging means based upon each differential pressure as detected by each said differential pressure detection means, by an amount substantially sufficient to eliminate each said differential pressure; and, when the road speed of said vehicle is greater than said predetermined value, said computing and control means carries out a correction to the adjustment control of each said working fluid supplying and discharging means based upon each differential pressure signal obtained by passing signals through high band pass filters to eliminate transient fluctuations to indicate each actual differential pressure as detected by each said differential pressure detection means, by an amount substantially sufficient to eliminate each said differential pressure.

10. A vehicle height adjustment system according to claim 9, wherein, when the road speed of said vehicle is less than a predetermined value, or when the road speed of said vehicle is less than a predetermined value and also the vehicle is substantially travelling along a straight line, said computing and control means carries out a correction to the adjustment control of each said working fluid supplying and discharging means based upon each differential pressure as detected by each said differential pressure detection means, by an amount substantially sufficient to eliminate each said differential pressure; and, when the road speed of said vehicle is greater than said predetermined value and also the vehicle is substantially travelling along a curve, said computing and control means carries out a correction to the adjustment control of each said working fluid supplying and discharging means based upon each differential pressure signal obtained by passing signals through high band pass filters to eliminate transient flutuations to indicate each actual differential pressure as detected by each said differential pressure detection means, by an amount substantially sufficient to eliminate each said differential pressure.

11. A vehicle height adjustment system according to claim 9, said vehicle having tires, wherein, when the road speed of said vehicle is greater than said predetermined value, said computing and control means derives a value representing the flexion amounts of said tires based on a signal indicating each differential pressure as detected by each said differential pressure detection means, fixes as new standard wheel heights the sums of the previous standard wheel heights and said values representing the flexion amounts of said tires, and carries out a correction to the adjustment control of each said working fluid supplying and discharging means based upon each differential pressure signal obtained by passing signals through high band pass filters to eliminate transient fluctuations to indicate each actual differential pressure as detected by each said differential pressure detection means, and based upon a signal indicating an amount substantially sufficient to compensate for said tire flexion.

12. A vehicle height adjustment system according to claim 9, said vehicle having tires, wherein, when the road speed of said vehicle is less than said predetermined value, or when the road speed of said vehicle is less than a predetermined value and also the vehicle is substantially travelling along a straight line, said computing and control means carries out a correction to the adjustment control of each said working fluid supplying and discharging means based upon each differential pressure as detected by each said differential pressure detection means, by an amount substantially sufficient to eliminate each said differential pressure; and, when the road speed of sid vehicle is greater than said predetermined value and also the vehicle is substantially travelling along a curve, said computing and control means derives values representing the flexion amounts of said tires based on signals indicating each differential pressure as detected by each said differential pressure detection means, fixes as new standard wheel heights the sums of the previous standard wheel heights and said values representing the flexion amounts of said tires, and carries out a correction to the adjustment control of each said working fluid supplying and discharging means based upon each differential pressure signal obtained by passing signals through high band pass to eliminate transient fluctuations to indicate each actual differential pressure as detected by each said differential pressure detection means, and based upon a signal indicating an amount substantially sufficient to compensate for said tire flexion.

13. A vehicle height adjustment system according to claim 9, further comprising a conduit communciating together said pressure chambers of each said left and right pair of said actuator assemblies, wherein each said differential pressure detection means is provided at an intermediate point of said conduit.

* * * * *

UNITED STATES PATENT AND TRADEMARK OFFICE
CERTIFICATE OF CORRECTION

PATENT NO. : 4,821,191

DATED : April 11, 1989

INVENTOR(S) : Hiroyuki Ikemoto; Yasuji Arai; Osamu Yasuike; Nobutaka Oowa; Shunichi Doi It is certified that error appears in the above-identified patent and that said Letters Patent is hereby corrected as shown below:

Column 29, line 54, after "eliminate" insert --each said loading deviation; and, when the road speed of said vehicle is greater than said predetermined value, based upon a loading signal to indicate each actual wheel loading as detected by each said loading detection means, by an amount substantially sufficient to eliminate--.

Signed and Sealed this

Thirteenth Day of February, 1990

Attest:

JEFFREY M. SAMUELS

Attesting Officer     Acting Commissioner of Patents and Trademarks